United States Patent
Xue et al.

(10) Patent No.: US 11,937,297 B2
(45) Date of Patent: *Mar. 19, 2024

(54) ASYNCHRONOUS SPATIAL LBT

(71) Applicant: QUALCOMM Incorporated, San Diego, CA (US)

(72) Inventors: Yisheng Xue, San Diego, CA (US); Xiaoxia Zhang, San Diego, CA (US); Siddhartha Mallik, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

This patent is subject to a terminal disclaimer.

(21) Appl. No.: 17/380,702

(22) Filed: Jul. 20, 2021

(65) Prior Publication Data

US 2021/0352719 A1 Nov. 11, 2021

Related U.S. Application Data

(63) Continuation of application No. 16/141,616, filed on Sep. 25, 2018, now Pat. No. 11,102,815.
(Continued)

(51) Int. Cl.
*H04W 74/08* (2009.01)
*B30B 11/18* (2006.01)
(Continued)

(52) U.S. Cl.
CPC ......... *H04W 74/0808* (2013.01); *B30B 11/18* (2013.01); *B31B 70/645* (2017.08);
(Continued)

(58) Field of Classification Search
CPC ............. H04W 74/0808; H04W 16/14; H04W 72/046; H04W 74/0816; B30B 11/18;
(Continued)

(56) References Cited

U.S. PATENT DOCUMENTS 7,408,976 B1 * 8/2008 Narasimhan ...... H04L 25/03159
455/132
10,136,452 B2 11/2018 Liu et al.
(Continued)

FOREIGN PATENT DOCUMENTS

CN 106797662 A 5/2017
CN 107006038 A 8/2017
(Continued)

OTHER PUBLICATIONS

Kwon, Hwan-Joon, et al. "Licensed-assisted access to unlicensed spectrum in LTE release 13." IEEE communications magazine 55.2 (2016): 201-207. (Year: 2016).*

(Continued)

*Primary Examiner* — Sharad Rampuria
(74) *Attorney, Agent, or Firm* — Norton Rose Fulbright US LLP

(57) ABSTRACT

Improvements to asynchronous spatial listen before talk (LBT) procedures are disclosed. In a shared spectrum network spatial LBT procedures are used for directionally targeting the channel reservation process. Prior to transmitting channel reservation signaling, the transmitter and receiver determine an effective interference considering available multiple input, multiple output (MIMO) configuration information. When the effective interference exceeds a predefined threshold, the node may without transmission of its channel reservation signal. Otherwise, when the effective interference remains within the threshold, each node's transmitted channel reservation signal may also identify at least a beamforming matrix either as payload or used to precode the node's channel reservation signal.

30 Claims, 17 Drawing Sheets

Related U.S. Application Data

(60) Provisional application No. 62/566,772, filed on Oct. 2, 2017.

(51) Int. Cl.

| | | |
|---|---|---|
| *B31B 70/64* | (2017.01) | |
| *B31B 70/81* | (2017.01) | |
| *B31B 70/88* | (2017.01) | |
| *B31B 155/00* | (2017.01) | |
| *B31B 160/10* | (2017.01) | |
| *B31B 170/30* | (2017.01) | |
| *B32B 3/10* | (2006.01) | |
| *B32B 3/28* | (2006.01) | |
| *B32B 7/12* | (2006.01) | |
| *B32B 37/10* | (2006.01) | |
| *B32B 38/00* | (2006.01) | |
| *H04B 7/0413* | (2017.01) | |
| *H04B 7/0452* | (2017.01) | |
| *H04B 7/06* | (2006.01) | |
| *H04L 5/00* | (2006.01) | |
| *H04W 16/14* | (2009.01) | |
| *H04W 72/044* | (2023.01) | |

(52) U.S. Cl.
CPC .......... *B31B 70/8135* (2017.08); *B31B 70/88* (2017.08); *B32B 3/10* (2013.01); *B32B 3/28* (2013.01); *B32B 7/12* (2013.01); *B32B 37/1045* (2013.01); *B32B 38/0012* (2013.01); *H04B 7/0413* (2013.01); *H04B 7/0452* (2013.01); *H04B 7/0617* (2013.01); *H04L 5/00* (2013.01); *H04W 16/14* (2013.01); *H04W 72/046* (2013.01); *H04W 74/0816* (2013.01); *B31B 2155/0014* (2017.08); *B31B 2155/002* (2017.08); *B31B 2160/10* (2017.08); *B31B 2170/30* (2017.08)

(58) Field of Classification Search
CPC ... B31B 70/645; B31B 70/8135; B31B 70/88; B31B 2155/0014; B31B 2155/002; B31B 2160/10; B31B 2170/30; B32B 3/10; B32B 3/28; B32B 7/12; B32B 37/1045; B32B 38/0012; H04B 7/0413; H04B 7/0452; H04B 7/0617; H04L 5/00; H04L 5/0023; H04L 5/0051

See application file for complete search history.

(56) References Cited

U.S. PATENT DOCUMENTS

| | | |
|---|---|---|
| 10,341,914 B2 | 7/2019 | Luo et al. |
| 10,701,729 B2 | 6/2020 | Luo et al. |
| 2013/0322280 A1 | 12/2013 | Pi |
| 2016/0344526 A1 | 11/2016 | Fan et al. |
| 2016/0366689 A1 | 12/2016 | Zhang et al. |
| 2017/0118773 A1 | 4/2017 | Cariou et al. |
| 2017/0187435 A1* | 6/2017 | Cariou .............. H04W 74/0816 |
| 2019/0104547 A1 | 4/2019 | Xue et al. |

FOREIGN PATENT DOCUMENTS

| | | |
|---|---|---|
| WO | WO-2015126916 | 8/2015 |
| WO | WO-2015187804 A1 | 12/2015 |
| WO | WO-2016137948 A1 | 9/2016 |

OTHER PUBLICATIONS

Taiwan Search Report—TW107133784—TIPO—dated Oct. 11, 2021.
International Search Report and Written Opinion—PCT/US2018/052808—ISA/EPO—dated Dec. 14, 2018.
Xiang W., et al., "Enhanced Clear Channel Assessment" In: "5G Mobile Communications", Oct. 13, 2016 (Oct. 13, 2016), Springer, XP055529049, pp. 669-672.
Qualcomm Incorporated: "Remaining Details of UL LBT," 3GPP Draft, 3GPP TSG RAN WG1 #86, R1-166255, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016, 8 pages, XP051125296, URL: http://www.3gpp.org/ftp/Meetings_3GPP_SYNC/RAN1/Docs/ [retrieved on Aug. 21, 2016].

* cited by examiner

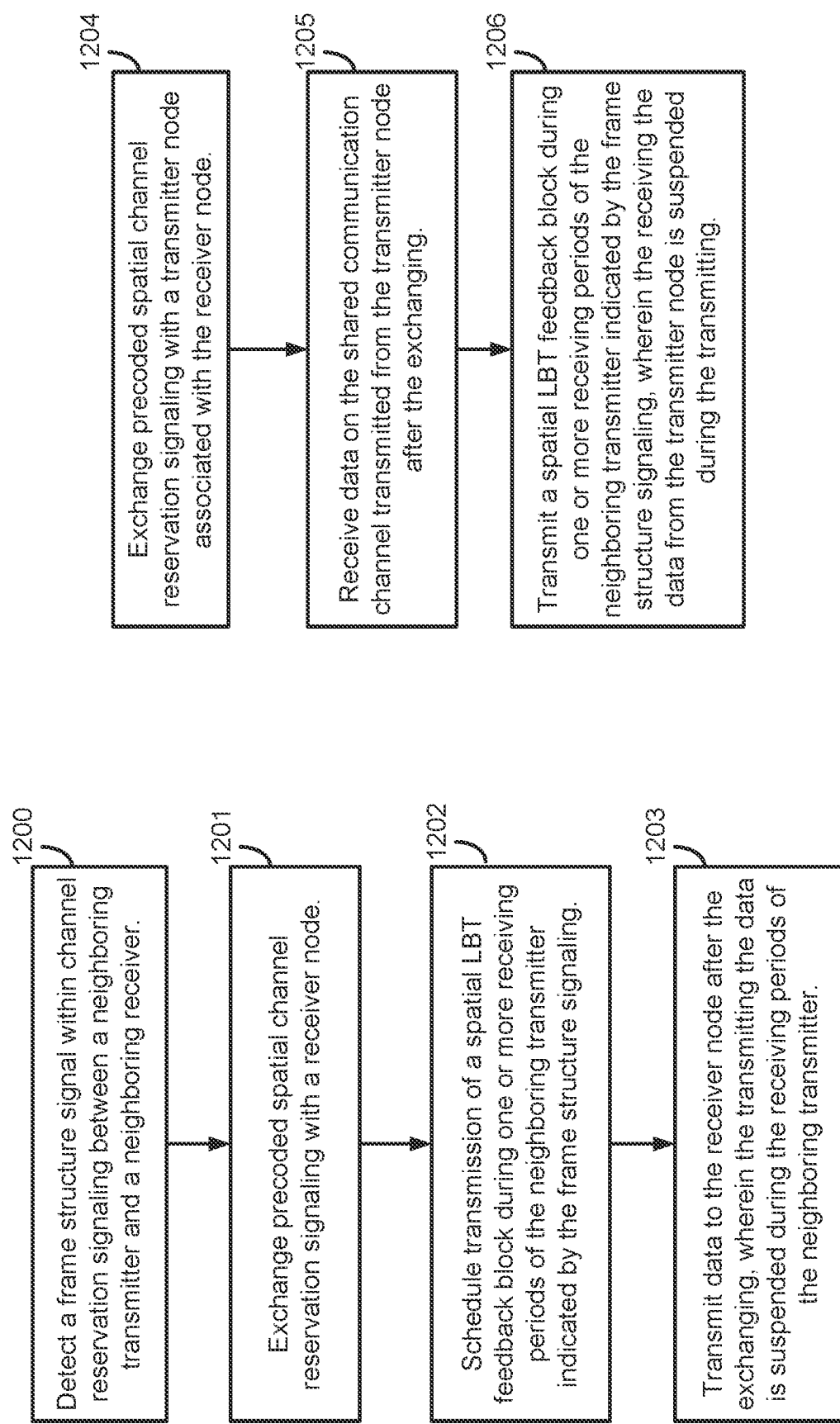

ASYNCHRONOUS SPATIAL LBT

CROSS-REFERENCE TO RELATED APPLICATIONS

This application is a continuation of and claims the benefit of U.S. patent application Ser. No. 16/141,616, entitled, "Asynchronous Spatial LBT," filed on Sep. 25, 2018, and claims the benefit of U.S. Provisional Patent Application No. 62/566,772, entitled, "Asynchronous Spatial LBT," filed on Oct. 2, 2017, which is expressly incorporated by reference herein in its entirety.

TECHNICAL FIELD

Aspects of the present disclosure relate generally to wireless communication systems, and more particularly, to asynchronous spatial listen before talk (LBT) procedures.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In one aspect of the disclosure, a method of wireless communication includes requesting, by a base station, a non-precoded sounding reference signal (SRS) from one or more served UEs at one or more intervals, determining, by the base station, a channel estimate to each of the one or more served UEs using the non-precoded SRS received from the one or more served UEs, computing, by the base station, multiple input, multiple output (MIMO) configuration information for the base station based on one or more of the channel estimate and a running average of interference covariance, Rnn, from the one or more served UEs, performing, by the base station, an enhanced clear channel assessment (eCCA) using a first random contention window value, wherein the eCCA is performed on a shared communication channel, transmitting, by the base station, a spatial channel reservation signal on the shared communication channel to at least one of the one or more served UEs in response to success of the eCCA, wherein the spatial channel reservation signal identifies the MIMO configuration information, including at least a transmit beamforming (TxBF) directional parameter, and transmitting, by the base station, data on the shared communication channel to the at least one of the one or more served UEs in response to a spatial channel reservation response signal received from the at least one of the one or more served UEs.

In an additional aspect of the disclosure, a method of wireless communication includes receiving, by a UE, a spatial channel reservation signal from a serving base station, wherein the spatial channel reservation signal identifies MIMO configuration information, including at least a TxBF parameter, performing, by the UE, a clear channel assessment (CCA) on a shared communication channel, transmitting, by the UE, a spatial channel reservation response signal to the serving base station in response to success of the CCA, wherein the spatial channel reservation response signal identifies at least a receive beamforming (RxBF) directional parameter, and receiving, by the UE after transmission of the spatial channel reservation response signal, data transmissions from the serving base station on the shared communication channel.

In an additional aspect of the disclosure, a method of wireless communication includes computing, by a base station, MIMO configuration information for the base station to at least one UE scheduled for uplink transmissions, wherein the MIMO configuration information is based one or more of a channel estimate and a current interference covariance, Rnn, from the at least one UE, performing, by the base station, an eCCA using a first random contention window value, wherein the eCCA is performed on a shared communication channel, transmitting, by the base station, a spatial channel reservation signal on the shared communication channel to a first UE of the at least one UE in response to success of the eCCA, wherein the spatial channel reservation signal identifies the MIMO configuration information, including at least a RxBF directional parameter, and receiving, by the base station, the uplink transmissions from the first UE on the shared communication channel in response to a spatial channel reservation response signal received from the first UE.

In an additional aspect of the disclosure, a method of wireless communication includes transmitting, by a UE, an uplink scheduling request for uplink transmissions to a serving base station, receiving, by the UE, a spatial channel reservation signal from the serving base station, wherein the spatial channel reservation signal identifies MIMO configuration information, including at least a RxBF directional parameter, performing, by the UE, a CCA on a shared communication channel, transmitting, by the UE, a spatial channel reservation response signal to the serving base station in response to success of the CCA, wherein the spatial channel reservation response signal identifies at least a TxBF directional parameter, and transmitting, by the UE after transmission of the spatial channel reservation response signal, the uplink transmissions to the serving base station on the shared communication channel.

In an additional aspect of the disclosure, a method of wireless communication includes detecting, at a transmitter node, a frame structure signal within channel reservation signaling on a shared communication channel between a neighboring transmitter and a neighboring receiver, exchanging, by the transmitter node, precoded spatial channel reservation signaling with a receiver node associated with the transmitter node, scheduling, by the transmitter node, transmission by the receiver node of a spatial listen before talk (LBT) feedback block on the shared communication channel during one or more receiving periods of the neighboring transmitter indicated by the frame structure signaling, and transmitting, by the transmitter node, data on the shared communication channel to the receiver node after the exchanging, wherein the transmitting the data is suspended during the one or more receiving periods of the neighboring transmitter.

In an additional aspect of the disclosure, a method of wireless communication includes exchanging, by the receiver node, precoded spatial channel reservation signaling with a transmitter node associated with the receiver node, receiving, by the receiver node, data on the shared communication channel transmitted from the transmitter node after the exchanging, and transmitting, by the receiver node scheduled by the transmitter node, a spatial LBT feedback block on the shared communication channel during one or more receiving periods of the neighboring transmitter indicated by the frame structure signaling, wherein the receiving the data from the transmitter node is suspended during the one or more receiving periods.

In an additional aspect of the disclosure, a method of wireless communication includes computing, by a base station, MIMO configuration information for the base station to a UE scheduled for uplink transmissions, wherein the MIMO configuration information is based at least in part on a channel estimate and a current interference covariance from the UE, performing, by the base station, a CCA on a shared communication channel, wherein the CCA is performed based on an effective interference computed using the MIMO configuration information compared to a default power detection threshold, transmitting, by the base station, a spatial channel reservation signal to the UE in response to success of the CCA, wherein the spatial channel reservation signal includes an initial contention window counter value for an eCCA to be performed by the UE, and receiving, by the base station, the uplink transmissions on the shared communication channel from the UE in response to a spatial channel reservation response signal received from the UE.

In an additional aspect of the disclosure, a method of wireless communication includes transmitting, by a UE, an uplink scheduling request for uplink transmissions to a serving base station, receiving, by the UE, a spatial channel reservation signal from the serving base station, wherein the spatial channel reservation signal identifies MIMO configuration information and an initial contention window counter value, performing, by the base station, an eCCA on a shared communication channel, wherein the eCCA is performed based on an effective interference computed using the MIMO configuration information compared to a default power detection threshold, transmitting, by the UE, a spatial channel reservation response signal to the serving base station in response to success of the eCCA, and transmitting, by the UE after transmission of the spatial channel reservation response signal, the uplink transmissions to the serving base station on the shared communication channel.

In an additional aspect of the disclosure, a method of wireless communications includes receiving, by a receiver node, a spatial channel reservation signal from a transmitter node, wherein the spatial channel reservation signal includes a request precoding flag identifying the spatial channel reservation signal as one of: precoded or non-precoded, processing, by the receiver node, the spatial channel reservation signal according to a value of the request signal precoding flag, and transmitting, by the receiver node, a spatial channel reservation response signal, wherein the spatial channel reservation response signal includes a response precoding flag identifying the spatial channel reservation signal as one of: precoded or non-precoded.

In an additional aspect of the disclosure, an apparatus configured for wireless communications includes means for requesting, by a base station, a non-precoded SRS from one or more served UEs at one or more intervals, means for determining, by the base station, a channel estimate to each of the one or more served UEs using the non-precoded SRS received from the one or more served UEs, means for computing, by the base station, MIMO configuration information for the base station based on one or more of the channel estimate and a running average of interference covariance, Rnn, from the one or more served UEs, means for performing, by the base station, an eCCA using a first random contention window value, wherein the eCCA is performed on a shared communication channel, means for transmitting, by the base station, a spatial channel reservation signal on the shared communication channel to at least one of the one or more served UEs in response to success of the eCCA, wherein the spatial channel reservation signal identifies the MIMO configuration information, including at least a TxBF directional parameter, and means for transmitting, by the base station, data on the shared communication channel to the at least one of the one or more served UEs in response to a spatial channel reservation response signal received from the at least one of the one or more served UEs.

In an additional aspect of the disclosure, an apparatus configured for wireless communications includes means for receiving, by a UE, a spatial channel reservation signal from a serving base station, wherein the spatial channel reservation signal identifies MIMO configuration information, including at least a TxBF parameter, means for performing, by the UE, a CCA on a shared communication channel, means for transmitting, by the UE, a spatial channel reservation response signal to the serving base station in response to success of the CCA, wherein the spatial channel reservation response signal identifies at least a RxBF directional parameter, and means for receiving, by the UE after transmission of the spatial channel reservation response signal, data transmissions from the serving base station on the shared communication channel.

In an additional aspect of the disclosure, an apparatus configured for wireless communications includes means for computing, by a base station, MIMO configuration information for the base station to at least one UE scheduled for uplink transmissions, wherein the MIMO configuration information is based one or more of a channel estimate and a current interference covariance, Rnn, from the at least one UE, means for performing, by the base station, an eCCA using a first random contention window value, wherein the eCCA is performed on a shared communication channel, means for transmitting, by the base station, a spatial channel reservation signal on the shared communication channel to a first UE of the at least one UE in response to success of the eCCA, wherein the spatial channel reservation signal identifies the MIMO configuration information, including at least a RxBF directional parameter, and means for receiving, by the base station, the uplink transmissions from the first UE on the shared communication channel in response to a spatial channel reservation response signal received from the first UE.

In an additional aspect of the disclosure, an apparatus configured for wireless communications includes means for transmitting, by a UE, an uplink scheduling request for uplink transmissions to a serving base station, means for receiving, by the UE, a spatial channel reservation signal from the serving base station, wherein the spatial channel reservation signal identifies MIMO configuration information, including at least a RxBF directional parameter, means for performing, by the UE, a CCA on a shared communication channel, transmitting, by the UE, a spatial channel reservation response signal to the serving base station in response to success of the CCA, wherein the spatial channel reservation response signal identifies at least a TxBF directional parameter, and means for transmitting, by the UE after transmission of the spatial channel reservation response signal, the uplink transmissions to the serving base station on the shared communication channel.

In an additional aspect of the disclosure, an apparatus configured for wireless communications includes means for detecting, at a transmitter node, a frame structure signal within channel reservation signaling on a shared communication channel between a neighboring transmitter and a neighboring receiver, means for exchanging, by the transmitter node, precoded spatial channel reservation signaling with a receiver node associated with the transmitter node, means for scheduling, by the transmitter node, transmission by the receiver node of a spatial LBT feedback block on the shared communication channel during one or more receiving periods of the neighboring transmitter indicated by the frame structure signaling, and means for transmitting, by the transmitter node, data on the shared communication channel to the receiver node after the exchanging, wherein the transmitting the data is suspended during the one or more receiving periods of the neighboring transmitter.

In an additional aspect of the disclosure, an apparatus configured for wireless communications includes means for exchanging, by the receiver node, precoded spatial channel reservation signaling with a transmitter node associated with the receiver node, means for receiving, by the receiver node, data on the shared communication channel transmitted from the transmitter node after exchange, and means for transmitting, by the receiver node scheduled by the transmitter node, a spatial LBT feedback block on the shared communication channel during one or more receiving periods of the neighboring transmitter indicated by the frame structure signaling, wherein execution of the means for receiving the data from the transmitter node is suspended during the one or more receiving periods.

In an additional aspect of the disclosure, an apparatus configured for wireless communications includes means for computing, by a base station, MIMO configuration information for the base station to a UE scheduled for uplink transmissions, wherein the MIMO configuration information is based at least in part on a channel estimate and a current interference covariance from the UE, means for performing, by the base station, a CCA on a shared communication channel, wherein the CCA is performed based on an effective interference computed using the MIMO configuration information compared to a default power detection threshold, means for transmitting, by the base station, a spatial channel reservation signal to the UE in response to success of the CCA, wherein the spatial channel reservation signal includes an initial contention window counter value for an eCCA to be performed by the UE, and means for receiving, by the base station, the uplink transmissions on the shared communication channel from the UE in response to a spatial channel reservation response signal received from the UE.

In an additional aspect of the disclosure, an apparatus configured for wireless communications includes means for transmitting, by a UE, an uplink scheduling request for uplink transmissions to a serving base station, means for receiving, by the UE, a spatial channel reservation signal from the serving base station, wherein the spatial channel reservation signal identifies MIMO configuration information and an initial contention window counter value, means for performing, by the base station, an eCCA on a shared communication channel, wherein the eCCA is performed based on an effective interference computed using the MIMO configuration information compared to a default power detection threshold, means for transmitting, by the UE, a spatial channel reservation response signal to the serving base station in response to success of the eCCA, and means for transmitting, by the UE after transmission of the spatial channel reservation response signal, the uplink transmissions to the serving base station on the shared communication channel.

In an additional aspect of the disclosure, an apparatus configured for wireless communications includes means for receiving, by a receiver node, a spatial channel reservation signal from a transmitter node, wherein the spatial channel reservation signal includes a request precoding flag identifying the spatial channel reservation signal as one of: precoded or non-precoded, means for processing, by the receiver node, the spatial channel reservation signal according to a value of the request signal precoding flag, and means for transmitting, by the receiver node, a spatial channel reservation response signal, wherein the spatial channel reservation response signal includes a response precoding flag identifying the spatial channel reservation signal as one of: precoded or non-precoded.

In an additional aspect of the disclosure, a non-transitory computer-readable medium having program code recorded thereon. The program code further includes code to request, by a base station, a non-precoded SRS from one or more served UEs at one or more intervals, code to determine, by the base station, a channel estimate to each of the one or more served UEs using the non-precoded SRS received from the one or more served UEs, code to compute, by the base station, MIMO configuration information for the base station based on one or more of the channel estimate and a running average of interference covariance, Rnn, from the one or more served UEs, code to perform, by the base station, an eCCA using a first random contention window value, wherein the eCCA is performed on a shared communication channel, code to transmit, by the base station, a spatial channel reservation signal on the shared communication channel to at least one of the one or more served UEs in response to success of the eCCA, wherein the spatial channel reservation signal identifies the MIMO configuration information, including at least a TxBF directional parameter, and code to transmit, by the base station, data on the shared communication channel to the at least one of the one or more served UEs in response to a spatial channel reservation response signal received from the at least one of the one or more served UEs.

In an additional aspect of the disclosure, a non-transitory computer-readable medium having program code recorded thereon. The program code further includes code to receive, by a UE, a spatial channel reservation signal from a serving base station, wherein the spatial channel reservation signal identifies MIMO configuration information, including at least a TxBF parameter, code to perform, by the UE, a CCA on a shared communication channel, code to transmit, by the UE, a spatial channel reservation response signal to the serving base station in response to success of the CCA, wherein the spatial channel reservation response signal identifies at least a RxBF directional parameter, and code to receive, by the UE after transmission of the spatial channel reservation response signal, data transmissions from the serving base station on the shared communication channel.

In an additional aspect of the disclosure, a non-transitory computer-readable medium having program code recorded thereon. The program code further includes code to compute, by a base station, MIMO configuration information for the base station to at least one UE scheduled for uplink transmissions, wherein the MIMO configuration information is based one or more of a channel estimate and a current interference covariance, Rnn, from the at least one UE, code to perform, by the base station, an eCCA using a first random contention window value, wherein the eCCA is performed on a shared communication channel, code to transmit, by the base station, a spatial channel reservation signal on the shared communication channel to a first UE of the at least one UE in response to success of the eCCA, wherein the spatial channel reservation signal identifies the MIMO configuration information, including at least a RxBF directional parameter, and code to receive, by the base station, the uplink transmissions from the first UE on the shared communication channel in response to a spatial channel reservation response signal received from the first UE.

In an additional aspect of the disclosure, a non-transitory computer-readable medium having program code recorded thereon. The program code further includes code to transmit, by a UE, an uplink scheduling request for uplink transmissions to a serving base station, code to receive, by the UE, a spatial channel reservation signal from the serving base station, wherein the spatial channel reservation signal identifies MIMO configuration information, including at least a RxBF directional parameter, code to perform, by the UE, a CCA on a shared communication channel, code to transmit, by the UE, a spatial channel reservation response signal to the serving base station in response to success of the CCA, wherein the spatial channel reservation response signal identifies at least a TxBF directional parameter, and code to transmit, by the UE after transmission of the spatial channel reservation response signal, the uplink transmissions to the serving base station on the shared communication channel.

In an additional aspect of the disclosure, a non-transitory computer-readable medium having program code recorded thereon. The program code further includes code to detect, at a transmitter node, a frame structure signal within channel reservation signaling on a shared communication channel between a neighboring transmitter and a neighboring receiver, code to exchange, by the transmitter node, precoded spatial channel reservation signaling with a receiver node associated with the transmitter node, code to schedule, by the transmitter node, transmission by the receiver node of a spatial LBT feedback block on the shared communication channel during one or more receiving periods of the neighboring transmitter indicated by the frame structure signaling, and code to transmit, by the transmitter node, data on the shared communication channel to the receiver node after the exchanging, wherein execution of the means for transmitting the data is suspended during the one or more receiving periods of the neighboring transmitter.

In an additional aspect of the disclosure, a non-transitory computer-readable medium having program code recorded thereon. The program code further includes code to exchange, by the receiver node, precoded spatial channel reservation signaling with a transmitter node associated with the receiver node, code to receive, by the receiver node, data on the shared communication channel transmitted from the transmitter node after exchange, and code to transmit, by the receiver node scheduled by the transmitter node, a spatial LBT feedback block on the shared communication channel during one or more receiving periods of the neighboring transmitter indicated by the frame structure signaling, wherein execution of the code to receive the data from the transmitter node is suspended during the one or more receiving periods.

In an additional aspect of the disclosure, a non-transitory computer-readable medium having program code recorded thereon. The program code further includes code to compute, by a base station, MIMO configuration information for the base station to a UE scheduled for uplink transmissions, wherein the MIMO configuration information is based at least in part on a channel estimate and a current interference covariance from the UE, code to perform, by the base station, a CCA on a shared communication channel, wherein the CCA is performed based on an effective interference computed using the MIMO configuration information compared to a default power detection threshold, code to transmit, by the base station, a spatial channel reservation signal to the UE in response to success of the CCA, wherein the spatial channel reservation signal includes an initial contention window counter value for an eCCA to be performed by the UE, and code to receive, by the base station, the uplink transmissions on the shared communication channel from the UE in response to a spatial channel reservation response signal received from the UE.

In an additional aspect of the disclosure, a non-transitory computer-readable medium having program code recorded thereon. The program code further includes code to receive, by the UE, a spatial channel reservation signal from the serving base station, wherein the spatial channel reservation signal identifies MIMO configuration information and an initial contention window counter value, code to perform, by the base station, an eCCA on a shared communication channel, wherein the eCCA is performed based on an effective interference computed using the MIMO configuration information compared to a default power detection threshold, code to transmit, by the UE, a spatial channel reservation response signal to the serving base station in response to success of the eCCA, and code to transmit, by the UE after transmission of the spatial channel reservation response signal, the uplink transmissions to the serving base station on the shared communication channel.

In an additional aspect of the disclosure, a non-transitory computer-readable medium having program code recorded thereon. The program code further includes code to receive, by a receiver node, a spatial channel reservation signal from a transmitter node, wherein the spatial channel reservation signal includes a request precoding flag identifying the spatial channel reservation signal as one of: precoded or non-precoded, code to process, by the receiver node, the spatial channel reservation signal according to a value of the request signal precoding flag, and code to transmit, by the receiver node, a spatial channel reservation response signal, wherein the spatial channel reservation response signal includes a response precoding flag identifying the spatial channel reservation signal as one of: precoded or non-precoded.

In an additional aspect of the disclosure, an apparatus configured for wireless communication is disclosed. The apparatus includes at least one processor, and a memory coupled to the processor. The processor is configured to request, by a base station, a non-precoded SRS from one or more served UEs at one or more intervals, to determine, by the base station, a channel estimate to each of the one or more served UEs using the non-precoded SRS received from the one or more served UEs, to compute, by the base station, MIMO configuration information for the base station based on one or more of the channel estimate and a running average of interference covariance, Rnn, from the one or more served UEs, to perform, by the base station, an eCCA using a first random contention window value, wherein the eCCA is performed on a shared communication channel, to transmit, by the base station, a spatial channel reservation signal on the shared communication channel to at least one of the one or more served UEs in response to success of the eCCA, wherein the spatial channel reservation signal identifies the MIMO configuration information, including at least a TxBF directional parameter, and to transmit, by the base station, data on the shared communication channel to the at least one of the one or more served UEs in response to a spatial channel reservation response signal received from the at least one of the one or more served UEs.

In an additional aspect of the disclosure, an apparatus configured for wireless communication is disclosed. The apparatus includes at least one processor, and a memory coupled to the processor. The processor is configured to receive, by a UE, a spatial channel reservation signal from a serving base station, wherein the spatial channel reservation signal identifies MIMO configuration information, including at least a TxBF parameter, to perform, by the UE, a CCA on a shared communication channel, to transmit, by the UE, a spatial channel reservation response signal to the serving base station in response to success of the CCA, wherein the spatial channel reservation response signal identifies at least a RxBF directional parameter, and to receive, by the UE after transmission of the spatial channel reservation response signal, data transmissions from the serving base station on the shared communication channel.

In an additional aspect of the disclosure, an apparatus configured for wireless communication is disclosed. The apparatus includes at least one processor, and a memory coupled to the processor. The processor is configured to compute, by a base station, MIMO configuration information for the base station to at least one UE scheduled for uplink transmissions, wherein the MIMO configuration information is based one or more of a channel estimate and a current interference covariance, Rnn, from the at least one UE, to perform, by the base station, an eCCA using a first random contention window value, wherein the eCCA is performed on a shared communication channel, to transmit, by the base station, a spatial channel reservation signal on the shared communication channel to a first UE of the at least one UE in response to success of the eCCA, wherein the spatial channel reservation signal identifies the MIMO configuration information, including at least a RxBF directional parameter, and to receive, by the base station, the uplink transmissions from the first UE on the shared communication channel in response to a spatial channel reservation response signal received from the first UE.

In an additional aspect of the disclosure, an apparatus configured for wireless communication is disclosed. The apparatus includes at least one processor, and a memory coupled to the processor. The processor is configured to transmit, by a UE, an uplink scheduling request for uplink transmissions to a serving base station, to receive, by the UE, a spatial channel reservation signal from the serving base station, wherein the spatial channel reservation signal identifies MIMO configuration information, including at least a RxBF directional parameter, to perform, by the UE, a CCA on a shared communication channel, to transmit, by the UE, a spatial channel reservation response signal to the serving base station in response to success of the CCA, wherein the spatial channel reservation response signal identifies at least a TxBF directional parameter, and to transmit, by the UE after transmission of the spatial channel reservation response signal, the uplink transmissions to the serving base station on the shared communication channel.

In an additional aspect of the disclosure, an apparatus configured for wireless communication is disclosed. The apparatus includes at least one processor, and a memory coupled to the processor. The processor is configured to detect, at a transmitter node, a frame structure signal within channel reservation signaling on a shared communication channel between a neighboring transmitter and a neighboring receiver, to exchange, by the transmitter node, precoded spatial channel reservation signaling with a receiver node associated with the transmitter node, to schedule, by the transmitter node, transmission by the receiver node of a spatial LBT feedback block on the shared communication channel during one or more receiving periods of the neighboring transmitter indicated by the frame structure signaling, and to transmit, by the transmitter node, data on the shared communication channel to the receiver node after the exchanging, wherein execution of the configuration to transmit the data is suspended during the one or more receiving periods of the neighboring transmitter.

In an additional aspect of the disclosure, an apparatus configured for wireless communication is disclosed. The apparatus includes at least one processor, and a memory coupled to the processor. The processor is configured to exchange, by the receiver node, precoded spatial channel reservation signaling with a transmitter node associated with the receiver node, to receive, by the receiver node, data on the shared communication channel transmitted from the transmitter node after exchange, and to transmit, by the receiver node scheduled by the transmitter node, a spatial LBT feedback block on the shared communication channel during one or more receiving periods of the neighboring transmitter indicated by the frame structure signaling, wherein execution of the configuration to receive the data from the transmitter node is suspended during the one or more receiving periods.

In an additional aspect of the disclosure, an apparatus configured for wireless communication is disclosed. The apparatus includes at least one processor, and a memory coupled to the processor. The processor is configured to compute, by a base station, MIMO configuration information for the base station to a UE scheduled for uplink transmissions, wherein the MIMO configuration information is based at least in part on a channel estimate and a current interference covariance from the UE, to perform, by the base station, a CCA on a shared communication channel, wherein the CCA is performed based on an effective interference computed using the MIMO configuration information compared to a default power detection threshold, to transmit, by the base station, a spatial channel reservation signal to the UE in response to success of the CCA, wherein the spatial channel reservation signal includes an initial contention window counter value for an eCCA to be performed by the UE, and to receive, by the base station, the uplink transmissions on the shared communication channel from the UE in response to a spatial channel reservation response signal received from the UE.

In an additional aspect of the disclosure, an apparatus configured for wireless communication is disclosed. The apparatus includes at least one processor, and a memory coupled to the processor. The processor is configured to receive, by the UE, a spatial channel reservation signal from the serving base station, wherein the spatial channel reservation signal identifies MIMO configuration information and an initial contention window counter value, to perform, by the base station, an eCCA on a shared communication channel, wherein the eCCA is performed based on an effective interference computed using the MIMO configuration information compared to a default power detection threshold, to transmit, by the UE, a spatial channel reservation response signal to the serving base station in response to success of the eCCA, and to transmit, by the UE after transmission of the spatial channel reservation response signal, the uplink transmissions to the serving base station on the shared communication channel.

In an additional aspect of the disclosure, an apparatus configured for wireless communication is disclosed. The apparatus includes at least one processor, and a memory coupled to the processor. The processor is configured to receive, by a receiver node, a spatial channel reservation signal from a transmitter node, wherein the spatial channel reservation signal includes a request precoding flag identifying the spatial channel reservation signal as one of: precoded or non-precoded, to process, by the receiver node, the spatial channel reservation signal according to a value of the request signal precoding flag, and to transmit, by the receiver node, a spatial channel reservation response signal, wherein the spatial channel reservation response signal includes a response precoding flag identifying the spatial channel reservation signal as one of: precoded or non-precoded.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 12A and 12B are block diagrams illustrating example blocks executed to implement aspects of the present disclosure.

DETAILED DESCRIPTION

Figure 1:
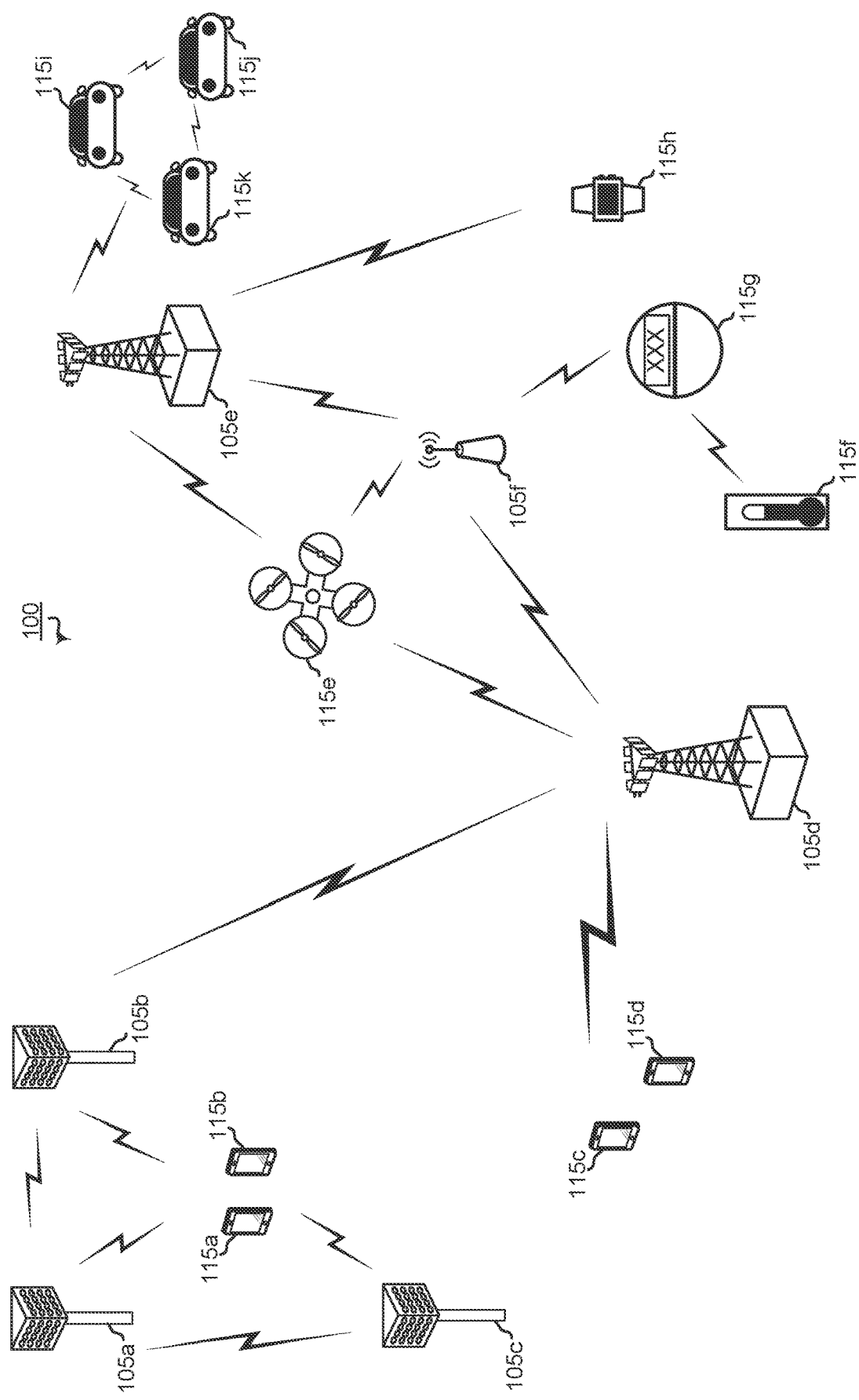
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
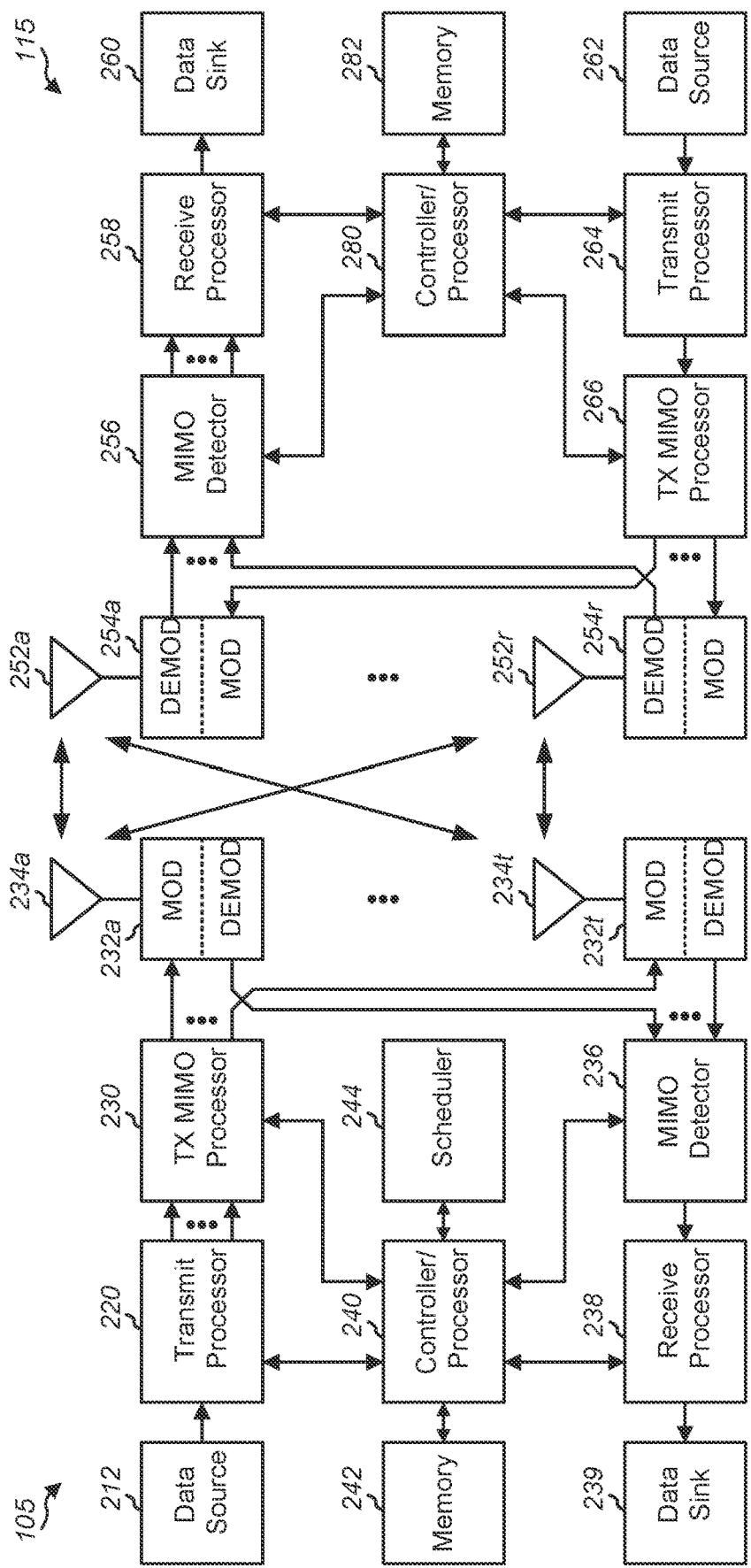
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 6A, 6B, 8A, 8B, 12A, 12B, 13A, 13B, and 14, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
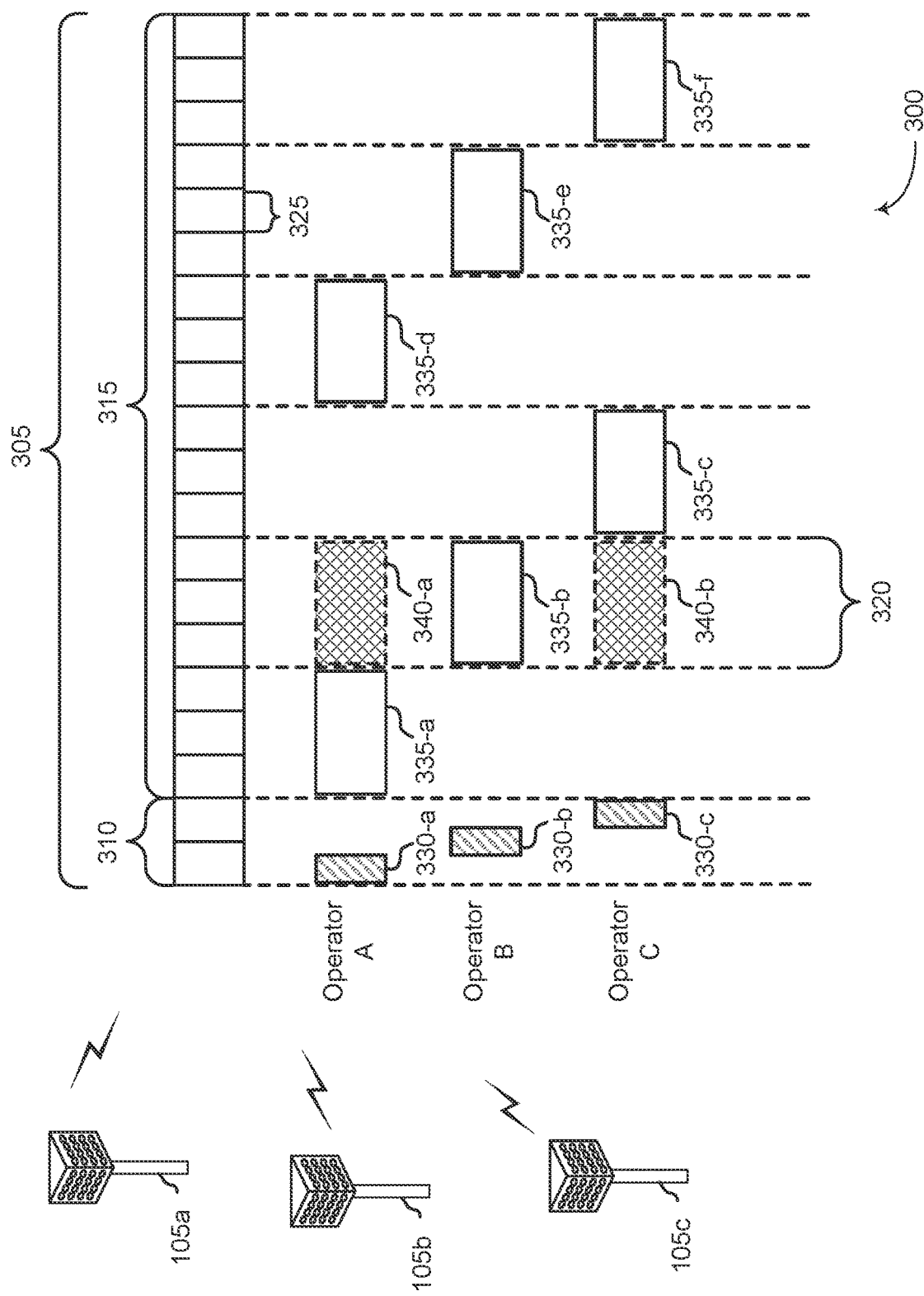
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

A network may include multiple UEs and base stations. When the UEs and base stations communicate over a shared frequency band, such as the unlicensed frequency band using a time division duplex (TDD) protocol, the UEs and base stations may use the same frequency spectrum band at the same time and cause collisions. A contention-based access protocol such as LBT protocol may be used to avoid such access collisions.

The network devices as described above and illustrated in FIG. 2 may perform a spatial LBT procedure as part of a CCA procedure prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of preamble that indicate use of the channel, with an energy threshold of the preamble. For example, another device may transmit a specific preamble prior to transmitting a data sequence. During a LBT session, if a CCA fails, the device may wait until the channel is clear before attempting to transmit. In some cases, LBT procedures are performed at a layer one (e.g., PHY) entity, whereas transmission scheduling may be performed at a higher layer (e.g., layer two).

Figure 4:
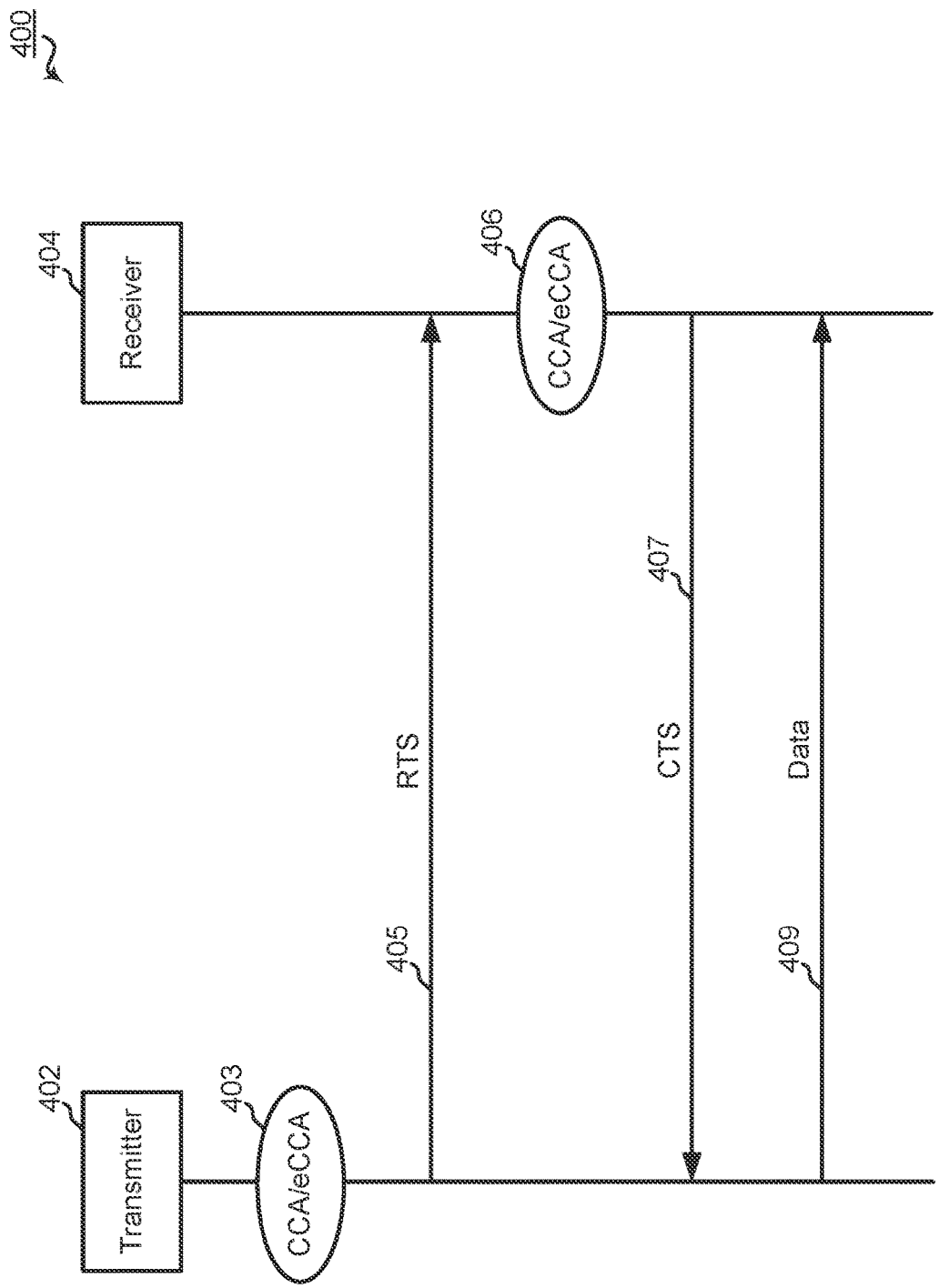
FIG. 4 is a call flow diagram illustrating a conventional LBT protocol.

FIG. 4 is a call flow diagram illustrating a conventional LBT protocol 400. In one aspect, transmitter 402 may be implemented at a base station and receiver 404 may be implemented at a UE. However, transmitter 402 may also be implemented at a UE and receiver 404 implemented at a base station.

Transmitter 402 may perform at 403 a clear channel assessment (CCA) procedure or an enhanced CCA (eCCA). The CCA or eCCA procedure indicates to the transmitting apparatus whether a channel of a wireless transmission medium such as an unlicensed radio frequency spectrum band is available or in use during a gating interval (also referred to as an LBT radio frame or a CCA radio frame).

After ascertaining through the above CCA or eCCA procedure that the wireless channel is available, transmitter 402 may reserve the wireless channel through a hand-shake procedure via a request-to-sent (RTS) and clear-to-send (CTS) message exchange. Transmitter 402 at 405 may transmit a RTS message to receiver 404 to indicate its desire to reserve a channel for data transmission. In one example embodiment, the base station may transmit a RTS message and then wait during an idle period to receive a CTS message.

In response, receiver 404 may check its resource and other conditions for receiving data. At 406, receiver 404 may also perform a CCA/eCCA procedure to sense the wireless channel and determine whether the wireless channel is available for transmission to the transmitter. When receiver 404 does not detect any frame transmissions that exceed a current interference threshold, after ascertaining the requested wireless channel is available, receiver 404 may send at 407 a CTS message to transmitter 402 to allow the data transmission to proceed.

In one example aspect, upon receiving the CTS message, transmitter 402 may commence data transmission at 409. In another example aspect, upon receiving the CTS message, transmitter 402 may transmit a header followed by data. Generally, transmitter 402 may initiate the RTS/CTS message exchange prior to transmitting the header. The receiver device, e.g., receiver 404, may receive the RTS message and determine if there are frames being transmitted from nodes in another network, e.g., such as base stations associated with a different operator and/or other Wi-Fi nodes.

In case that the channel reservation fails for some reason, transmitter 402 may start the LBT process again at 403 to perform a CCA or an eCCA procedure. The reasons that the channel reservation failure may occur include that the RTS or CTS message may be lost, the receiver does not have sufficient resources, the wireless medium is busy, etc.

CCA is a carrier sense mechanism that may be used in a spectrum sharing, asynchronous wireless communication system such as a wireless local area network (WLAN) system (e.g., WiFi, MuLTEfire, LAA, etc) or a wireless wide-area network (WWAN). One example CCA is the one defined in the IEEE 802.11-2007 standards as part of the Physical Medium Dependent (PMD) and Physical Layer Convergence Protocol (PLCP) layer. The CCA involves two related functions: carrier sense and energy detection, or CCA-CS and CCA-ED.

Carrier Sense (CCA-CS) refers to the ability of the receiver to detect and decode a reference signal such as a WiFi preamble. From the PLCP header field, the time duration (in µs) for which the medium will be occupied can be inferred and when such WiFi preamble is detected the CCA flag is held busy until the end of data transmission.

Energy Detection (CCA-ED) refers to the ability of the receiver to detect energy of a signal in the operating channel and back off data transmission. The energy detection is also referred to as power detection (PD) or LBT power detection. Some other terms may also be used to refer to detection of a signal on a wireless channel, such as preamble energy detection, sequence energy detection, or carrier energy sensing. As used in the present disclosure, these terms may be used interchangeably.

Conventionally, a default LBT PD threshold is defined and used during a LBT session. For example, −72 dMb PD threshold has been the rule of thumb for 3GPP LAA systems. If the in-band signal energy crosses this PD threshold, the wireless channel is held busy until the medium energy is below the PD threshold.

The eCCA procedure, in turn, involves the performance of a random number of N CCA procedures. The UEs and/or base stations may perform the eCCA procedure continuously for as long as they have data to transmit. The UEs and/or base stations may also perform the eCCA procedure continuously during any gap in an uplink or downlink transmission. The UEs and/or base stations may then access a channel after one CCA procedure.

The outcome of the CCA or the eCCA procedure may indicate to the transmitting network device (e.g., UE or base station) whether a channel of a shared radio frequency spectrum band is available or in use during the gating interval. When a CCA or an eCCA procedure indicates that the channel is available (e.g., "clear" for use) during a corresponding LBT radio frame, the transmitting network device may reserve and/or use the channel of the unlicensed radio frequency spectrum band during part or all of the LBT radio frame. When the CCA or the eCCA procedure indicates that the channel is not available (e.g., that the channel is in use or reserved by another wireless network device), the transmitting network device may be prevented from using the channel during the LBT radio frame.

As described above, the performance of a wireless communication system using the LBT protocol is closely related to the ability of the receiver or transmitter to detect energy (or power detection) of an interfering signal in the operating channel and back off data transmission. Conventionally, the PD threshold is set to a default value without consideration of MIMO configuration information. The PD threshold used during a LBT radio frame is also referred to as a LBT PD threshold throughout the present disclosure. A default LBT PD threshold may lead to a diminished performance of the wireless communication system.

Figure 5:
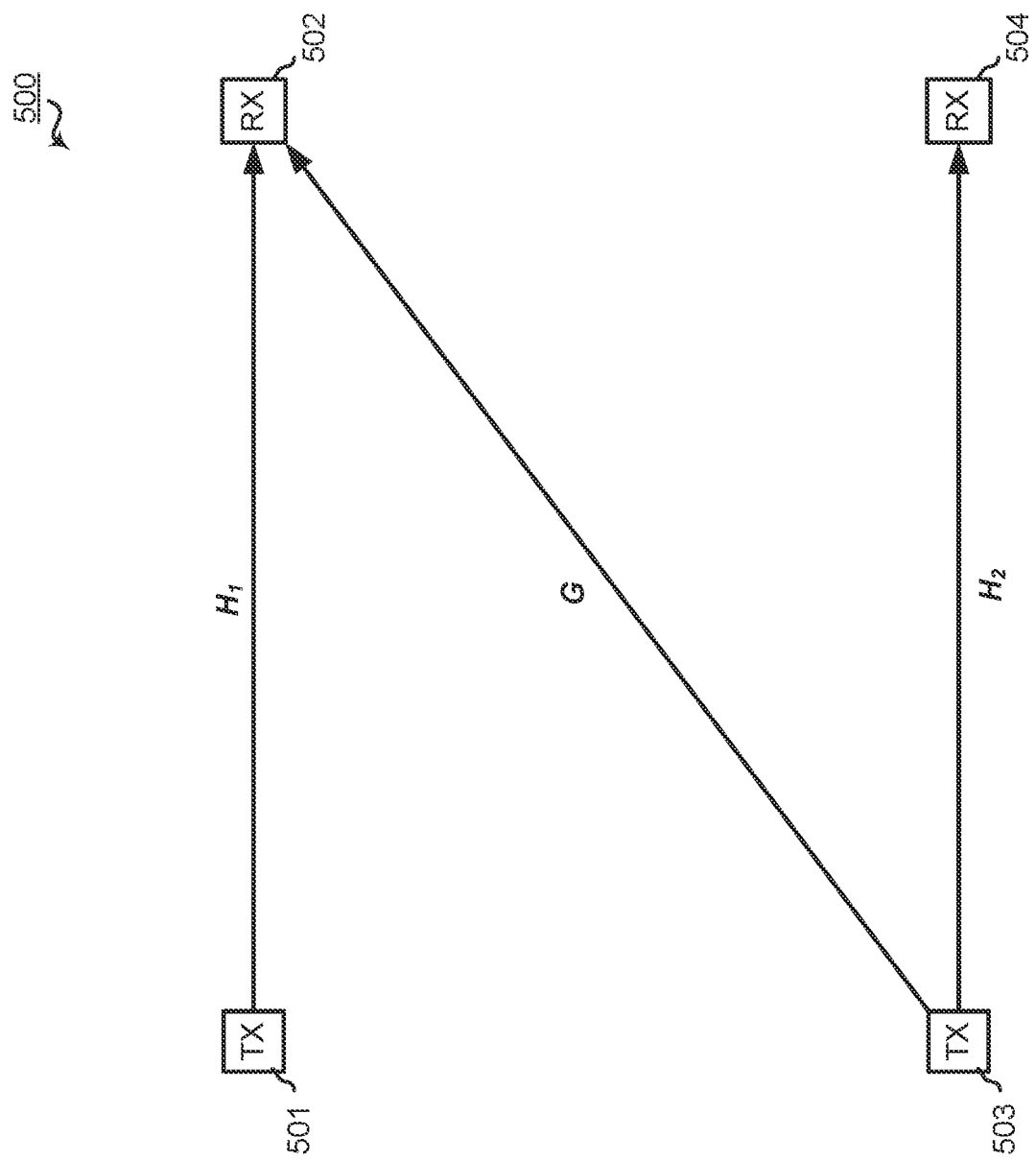
FIG. 5 is a block diagram illustrating an LBT mechanism during an LBT session.

FIG. 5 is a block diagram illustrating an LBT mechanism 500 during an LBT session. Transmitter 501 transmits to receiver 502, using rank r, over a 4×4 channel $H_1$. In the LBT mechanism 500, while transmitter 501 is transmitting data to receiver 502, transmitter 503 desires to transmit data to receiver 504. Transmitter 503 initiates an LBT session by first performing a CCA/eCCA procedure to determine whether the desired wireless channel is available. As part of the CCA/eCCA procedure, transmitter 503 may first estimate a cross-interference from transmitter 503 to receiver 502 over channel G, in addition to an omni-directional preamble based interference measurement. Transmitter 503 then sends an RTS message to receiver 504 after ascertaining that the wireless channel is clear to send.

When transmitters 501 and 503 are using lower ranks, the effective interference can be significantly smaller than what is predicted by path-loss only. Thus, spatial LBT goes beyond legacy LBT by considering the effective interference. In one example aspect, a singular-value decomposition (SVD) based on a transmit beamforming (TxBF) matrix, $W_T$, may be used for computing the effective interference. The TxBF $W_T$ matrix may include a directional element, such as a TxBF directional parameter, and a MIMO rank. The channel, $H_1$, from transmitter 501 to receiver 502 is decomposed as $H_1 = U_1 X_1 V_1^H$, where $U_1$ and $V_1^H$ are unitary matrices and $X_1$ represents a diagonal matrix value for $H_1$. Similarly, the channel, $H_2$, from transmitter 503 to receiver 504 can be decomposed as $H_2 = U_2 X_2 V_2^H$, where $U_2$ and $V_2^H$ are unitary matrices and $X_2$ represents a diagonal matrix value for $H_2$. While G represents the channel from transmitter 503 to receiver 502, then the effective interference can be computed as $V_1^H G V_2$. The determination of the SVD of the wireless channel based on the unitary matrices and the diagonal matrices of the beamforming matrices are commonly known in the field. In one other example aspects, other methods may be used to compute the effective interferences.

To accurately estimate the effective interference, the MIMO configuration information such as a rank of the transmitter is taken into account. This may result in a more accurate estimate of interference, fewer failures in LBT message exchanges, and higher throughput for the wireless communication system.

Figure 6A:
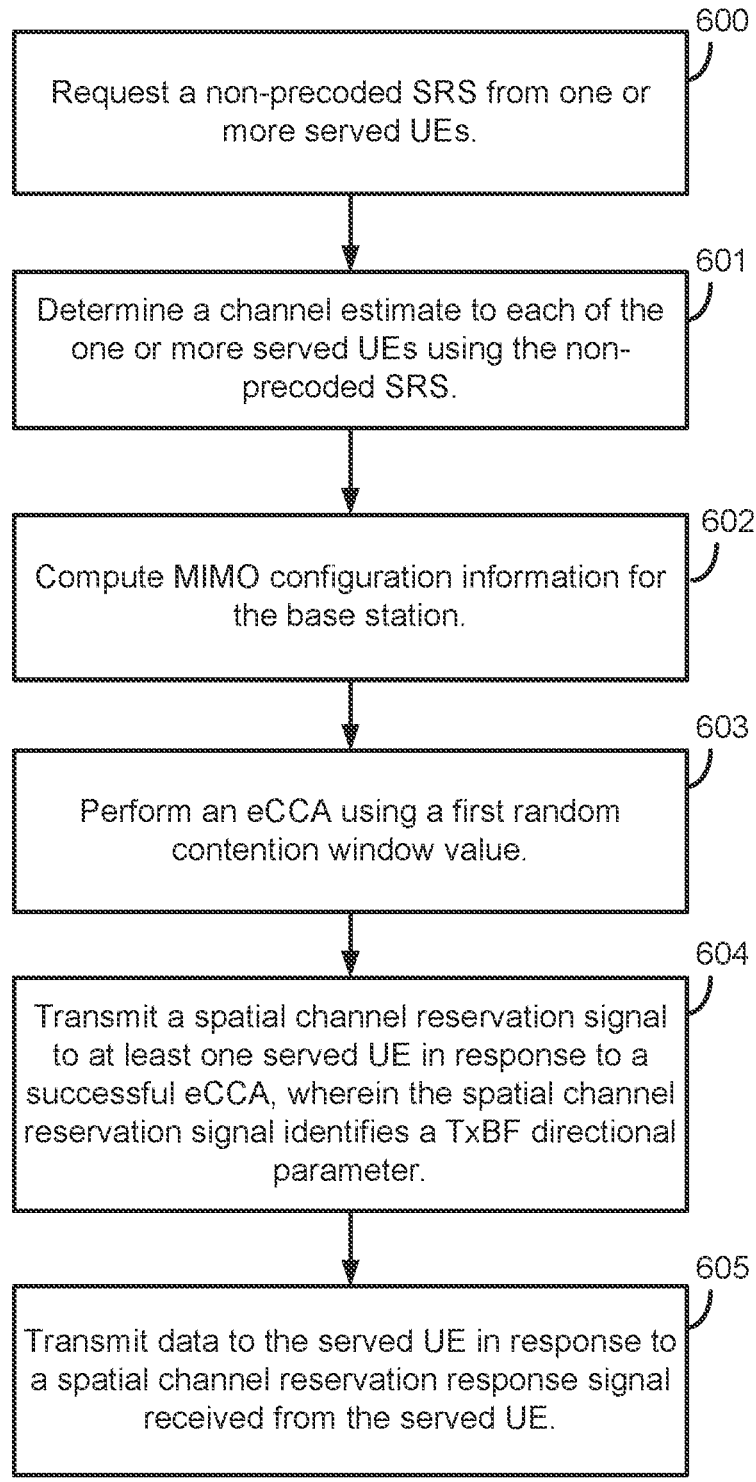
FIGS. 6A and 6B are block diagrams illustrating example blocks executed to implement aspects of the present disclosure.
Figure 15:
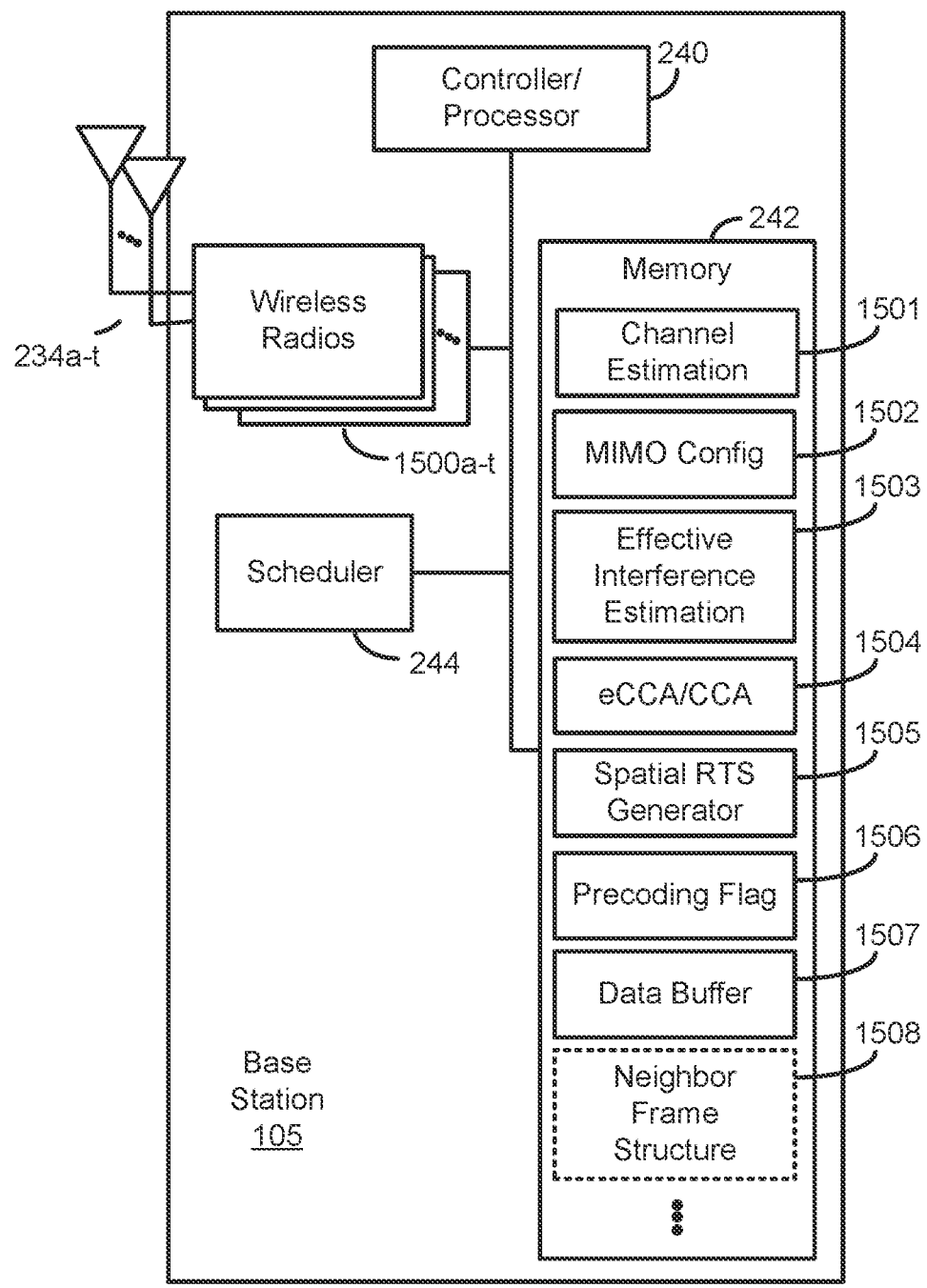
FIG. 15 is a block diagram illustrating a base station configured according to various aspects of the present disclosure.

FIG. 6A is a block diagram illustrating example blocks executed by a base station to implement one aspect of the present disclosure for downlink communications. The example blocks will also be described with respect to base station 105 as illustrated in FIG. 15. FIG. 15 is a block diagram illustrating base station 105 configured according to one aspect of the present disclosure. Base station 105 includes the structure, hardware, and components as illustrated for base station 105 of FIG. 2. For example, Base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1500*a-t* and antennas 234*a-t*. Wireless radios 1500*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 600, a base station requests a non-precoded sounding reference signal (SRS) from one or more served UEs. A base station, such as base station 105, may periodically request non-precoded SRS from each of its served UEs, via wireless radios 1500*a-t* and antennas 234*a-t*. In one example implementation, requests for non-precoded SRS every 100 ms may be sufficient to accommodate a UE traveling at a velocity of 3 kmph at 5 GHz, which may be assumed by 3GPP LAA scenarios. Base station 105 may set various periodic times or may aperiodically request such non-precoded SRS from the served UEs. Such requests and the determination of the channel estimate would not necessarily be coordinated with each LBT frame.

At block 601, the base station determines a channel estimate to each of the served UEs using the non-precoded SRS. Base station 105, under control of controller/processor 240, would execute channel estimation logic 1501, stored in memory 242, to generate the estimated channel based on any received non-precoded SRS. The requesting of non-precoded SRS and generation of the channel estimate may not occur for every LBT frame. Base station 105 may request such non-precoded SRS and determine the channel estimate at various periods or even aperiodically. When using the generated channel estimate for a spatial LBT procedure, base station 105 would use the current channel estimate.

At block 602, the base station computes MIMO configuration information for the base station. The base station, such as base station 105, may compute the various MIMO configuration parameters, such as $W_T$ and $W_R$ matrices (which include TxBF and RxBF directional parameters, respectively, and a MIMO rank), number of transmit antennas, number of receive antennas, and the like. Base station 105, under control of controller/processor 240, executes MIMO configuration logic 1502, stored in memory 242 to provide an execution environment for computation of the available MIMO configuration parameters. For example, the rank may be determined using the transmission power and running average of interference covariance, Rnn, that the base station maintains from its served UEs to learn long-term interference effects. The interference covariance, Rnn, from the served UEs includes a covariance based on the noise and interference experienced at the UE. In one example computation, $W_T$, may be determined by selecting the right singular vectors of H.

At block 603, the base station performs an eCCA using a first random contention window value, wherein the eCCA is performed on a shared communication channel. For example, base station 105, under control of controller/processor 240, executes eCCA/CCA logic 1503, stored in memory 242. The execution environment of eCCA/CCA logic 1503 provides the procedural steps that base station 105 executes in order to perform an eCCA or CCA. The eCCA procedure, for example, begins a counter counting down from the first random contention window value, selected between 0 and the contention window maximum (CWmax). Base station 105 computes the effective interference caused by the TxBF $W_T$, which include a TxBF directional parameter and rank, to any detected victim. Base station 105, under control of controller/processor 240, executes effective interference estimation logic 1503. The execution environment of effective interference estimation logic 1503 allows for base station 105 to compute the effective interference to any detected victims node based on transmissions according to TxBF $W_T$, as noted above. If the effective interference exceeds a pre-defined threshold interference (e.g., −72 dBm, −62 dBm, etc.), base station 105 may suspend the eCCA, draw a next random contention window value and begin another eCCA.

At block 604, the base station transmits a spatial channel reservation signal on the shared communication channel to the served UE in response to a successful eCCA, wherein the spatial channel reservation signal identifies the MIMO configuration information, including at least a TxBF directional parameter. If the effective interference calculated remains within the pre-defined threshold interference, then, when the eCCA counter reaches zero, the base station transmits a spatial RTS on the shared channel to the UE. For example, base station 105, upon determining that the effective interference is within the threshold, triggers execution of spatial RTS generator 1505, stored in memory 242. Legacy LBT systems transmitted RTS/CTS using omni-directional beams. However, the aspects of the present disclosure provide the execution environment of spatial RTS generator 1505, which uses spatial transmissions which transmit the RTS via wireless radios 1500*a-t* and antennas 234*a-t*, on a directional beam identified for the served UE. The execution environment of spatial RTS generator 1505 further provides for generation of the spatial RTS to identify the $W_T$ matrix, including TxBF directional parameter and rank, whether embedded as payload in the RTS or precoded in the RTS. A precoding flag 1506 may also be transmitted that identifies whether or not the RTS is precoded for downlink.

On the UE side, when the UE receives the spatial RTS with the identified beamforming matrix $W_T$, the UE may conduct its own CCA looking back to a history, if available, and calculating the effective interference that it may experience from any on-going aggressor transmitters. If the effective interference exceeds a pre-determined interference threshold (e.g., −72 dBm, −62 dBm, etc.), the UE may refrain from transmitting a CTS in response to the RTS. However, if the effective interference remains within the pre-determined threshold, the UE will transmit a spatial CTS to the base station. The spatial CTS may contain channel quality indicator (CQI) feedback measured by the UE from the RTS. The spatial CTS may also identify the RxBF matrix, $W_R$, which includes a RxBF directional parameter and rank. The rank of the $W_T$ and $W_R$ matrices is the same. As in block 604, $W_R$ may be identified either by embedding it in a payload of the CTS or by precoding the CTS with $W_R$. The UE may also use and transmit a precoding flag that identifies whether the CTS is precoded.

At block 605, the base station transmits data on the shared communication channel to the served UE in response to a spatial channel reservation response signal received from the UE. After receiving the spatial CTS, base station 105 transmits data, within data buffer 1507 of memory 242, at a constant length transmission opportunity. If the UE does not transmit at CTS or channel conditions prevent the base station from detecting the CTS transmission, a CTS time-out occurs. The CTS time-out causes an increase to the CWmax value. Base station 105 will re-draw another random contention window counter value to continue serving the UE for downlink by attempting a next eCCA procedure.

Figure 6B:
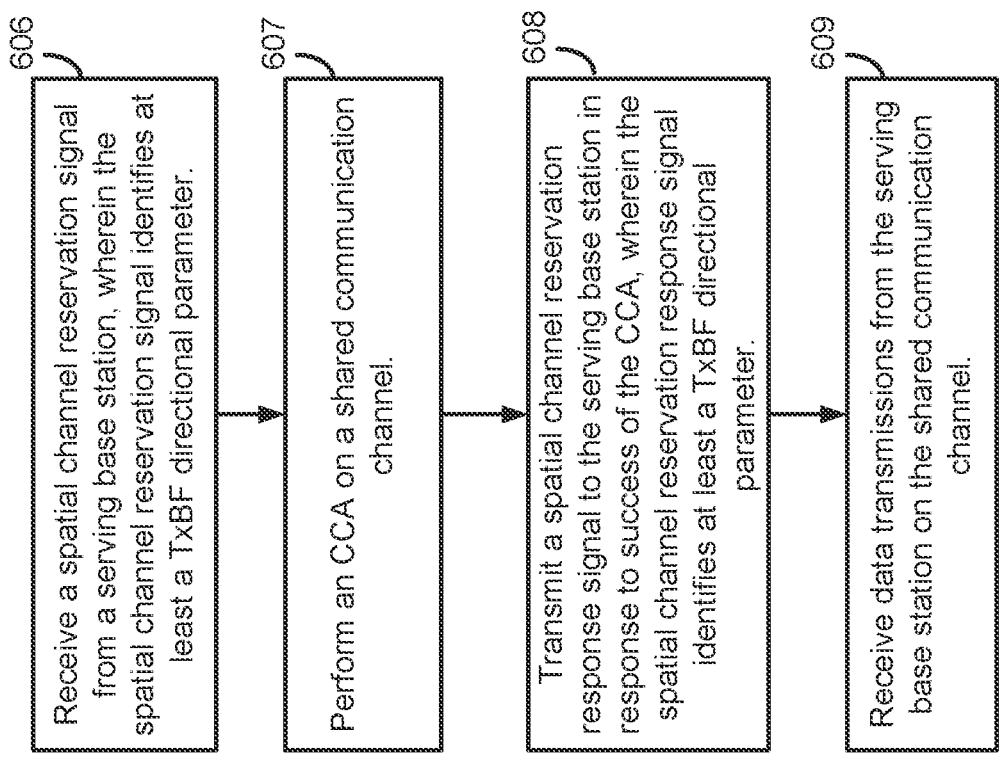
Figure 16:
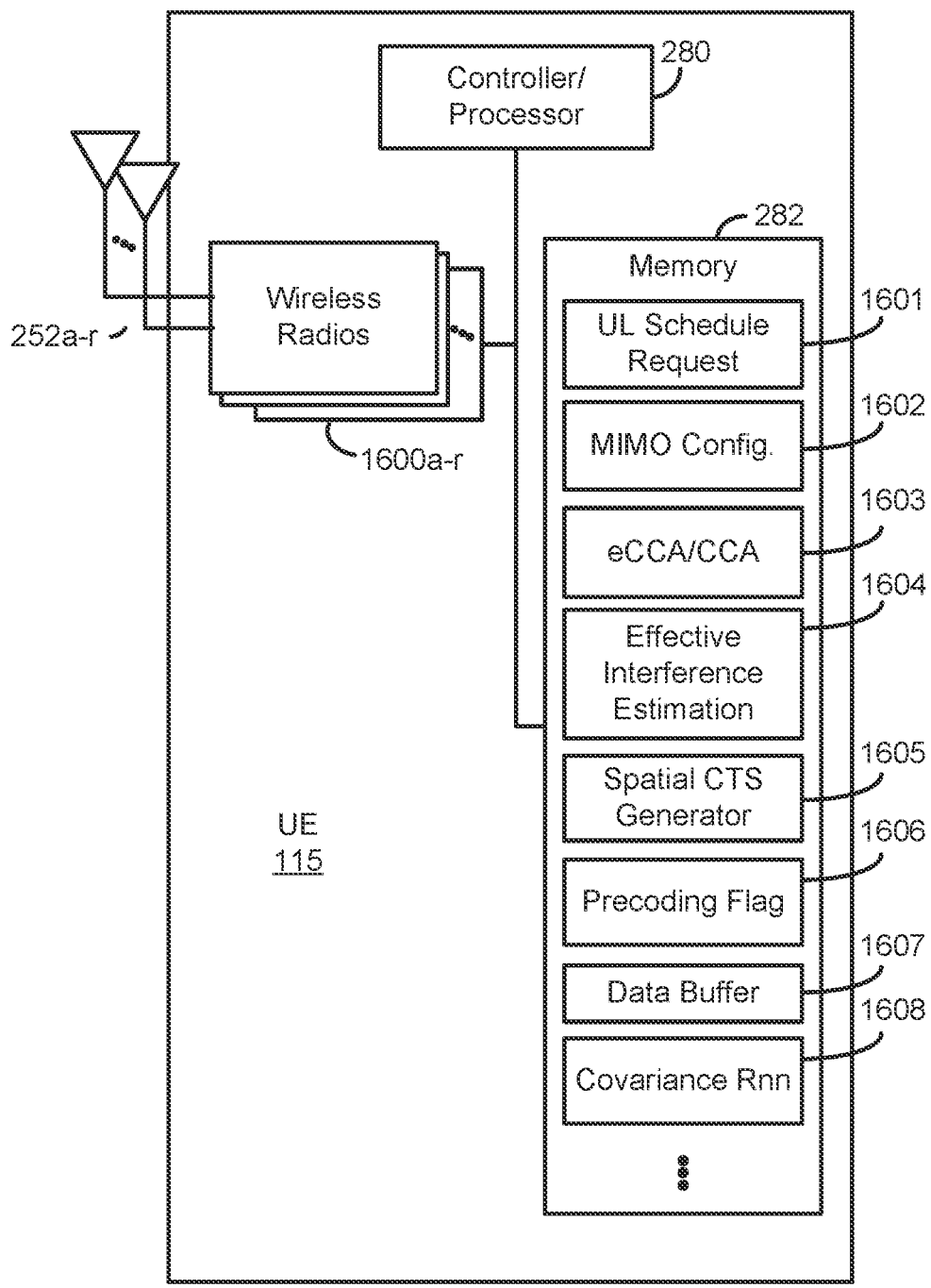
FIG. 16 is a block diagram illustrating a UE configured according to various aspects of the present disclosure.

FIG. 6B is a block diagram illustrating example blocks executed by a UE to implement one aspect of the present disclosure for downlink communications. The example blocks will also be described with respect to UE 115 as illustrated in FIG. 16. FIG. 16 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1600*a-r* and antennas 252*a-r*. Wireless radios 1600*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 606, the UE receives a spatial channel reservation signal from a serving base station, wherein the spatial channel reservation signal identifies MIMO configuration information, including at least a TxBF directional parameter. UE 115 receives the RTS from the serving base station via antennas 252*a-r* and wireless radios 1600*a-r* which identifies the $W_T$ matrix, including the TxBF directional parameter and rank, either as payload or through precoding of the RTS with the $W_T$ matrix. UE 115 then stored at least the $W_T$ matrix in MIMO configuration 1602, in memory 282. The RTS received from the serving base station may also include other MIMO configuration parameters, such as $W_R$, MCS, and the like. UE 115 would also store these parameters at MIMO configuration 1602.

At block 607, the UE performs a CCA on a shared communication channel. UE 115, under control of controller/processor 280, executes eCCA/CCA logic 1603, stored in memory 282. The execution environment of eCCA/CCA logic 1603 provides the procedures that UE 115 will execute to perform a CCA or eCCA. The CCA, for example, is performed to determine whether the channel is open for UE 115 to respond with its CTS. UE 115 conducts a CCA, according to the execution environment of eCCA/CCA logic 1603, looking back to history if available, and using the $W_T$ and rank to calculate the effective interference that it may experience during the downlink transmissions. UE 115, under control of controller/processor 280, executes effective interference estimation logic 1604. The execution environment of effective interference estimation logic 1604 allows for UE 115 to determine the interference that it may experience in consideration of transmissions from the serving base station according to $W_T$. If the effective interference is expected to exceed a pre-defined threshold (e.g., more than −72 dBm or −62 dBm), the UE may elect not to transmit CTS.

At block 608, the UE transmits a spatial channel reservation response signal to the serving base station in response to success of the CCA, wherein the spatial channel reservation response signal identifies at least a RxBX directional parameter. If the effective interference remains within the threshold, UE 115 responds by executing spatial CTS generator 1605, stored in memory 282. The execution environment of spatial CTS generator 1605 provides for UE 115 to transmit a spatial CTS with $W_R$, including the RxBF directional parameter and rank, embedded as payload or precoded into the CTS via wireless radios 1600*a-r* and antennas 252*a-r*. UE 115 may send a precoding flag 1606 to indicate whether the CTS is precoded for downlink.

At block 609, the UE receives data transmissions from the serving base station on the shared communication channel. Once the serving base station receives the CTS from UE 115, the serving base station may begin downlink transmissions. UE 115 receives the downlink transmissions via antennas 252*a-r* and wireless radios 1600*a-r*.

Figure 7:
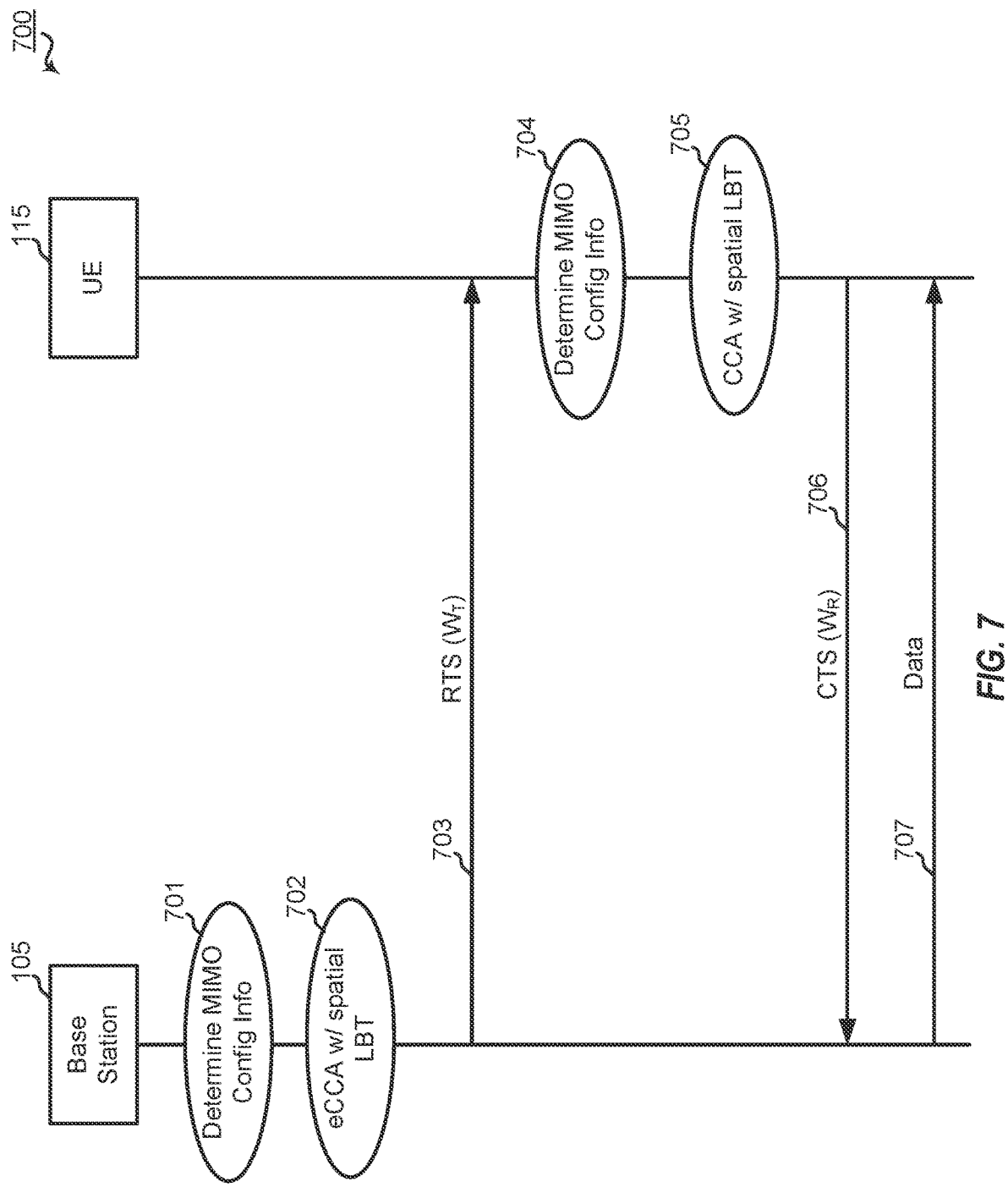
FIG. 7 is a call flow diagram illustrating an asynchronous spatial LBT procedure between a base station and UE configured according to one aspect of the present disclosure.

FIG. 7 is a call flow diagram illustrating an asynchronous spatial LBT procedure 700 between a base station 105 and UE 115 configured according to one aspect of the present disclosure. Base station 105 serves UE 115 with downlink data. At 701, base station 105 determines the MIMO configuration information. As disclosed above, base station 105 calculates the channel estimate, H, based on the non-precoded SRS periodically requested from its served UEs, including UE 115. Base station 105 also maintains a running average interference covariance, Rnn, from its served UEs, including UE 115 to observe the long-term interference aspects of the communication environment. Base station 105 may compute $W_T$ and $W_R$ based on the channel estimate H. It may also determine the rank based on the transmission power and running average interference covariance, Rnn.

At 702, base station 105 conducts an eCCA with a spatial LBT. Base station 105 calculates the effective interference caused by $W_T$ to any detected neighboring receivers. If such effective interference exceeds a pre-determined threshold, base station 105 suspends the eCCA. Otherwise, at 703, base station 105 transmits RTS identifying $W_T$, either as payload or precoded into the RTS. The precoding may be indicated by a precoding flag transmitted by base station 105.

At 704, UE 115 determines the MIMO configuration information. The MIMO configuration, such as $W_T$, $W_R$, and MCS may be received from base station 105. UE 115 may also estimate the rank and compute its own $W_R$. At 705, UE 115 performs CCA with a spatial LBT. UE 115 calculates the effective interference it will suffer based on any aggressor neighboring transmitters. The calculation of the effective interference uses the MIMO configuration information. If the effective interference exceeds a pre-determined threshold, UE 115 will not transmit a CTS. Otherwise, when the effective interference is within the thresholds, at 706, UE 115 will transmit CTS identifying $W_R$, including the RxBF directional parameter and rank, either as payload or precoded into the CTS. The precoding may also be indicated by a precoding flag transmitted by UE 115. Upon receipt of the CTS and $W_R$, base station 105 will begin downlink transmissions of data at 707.

Figure 8:
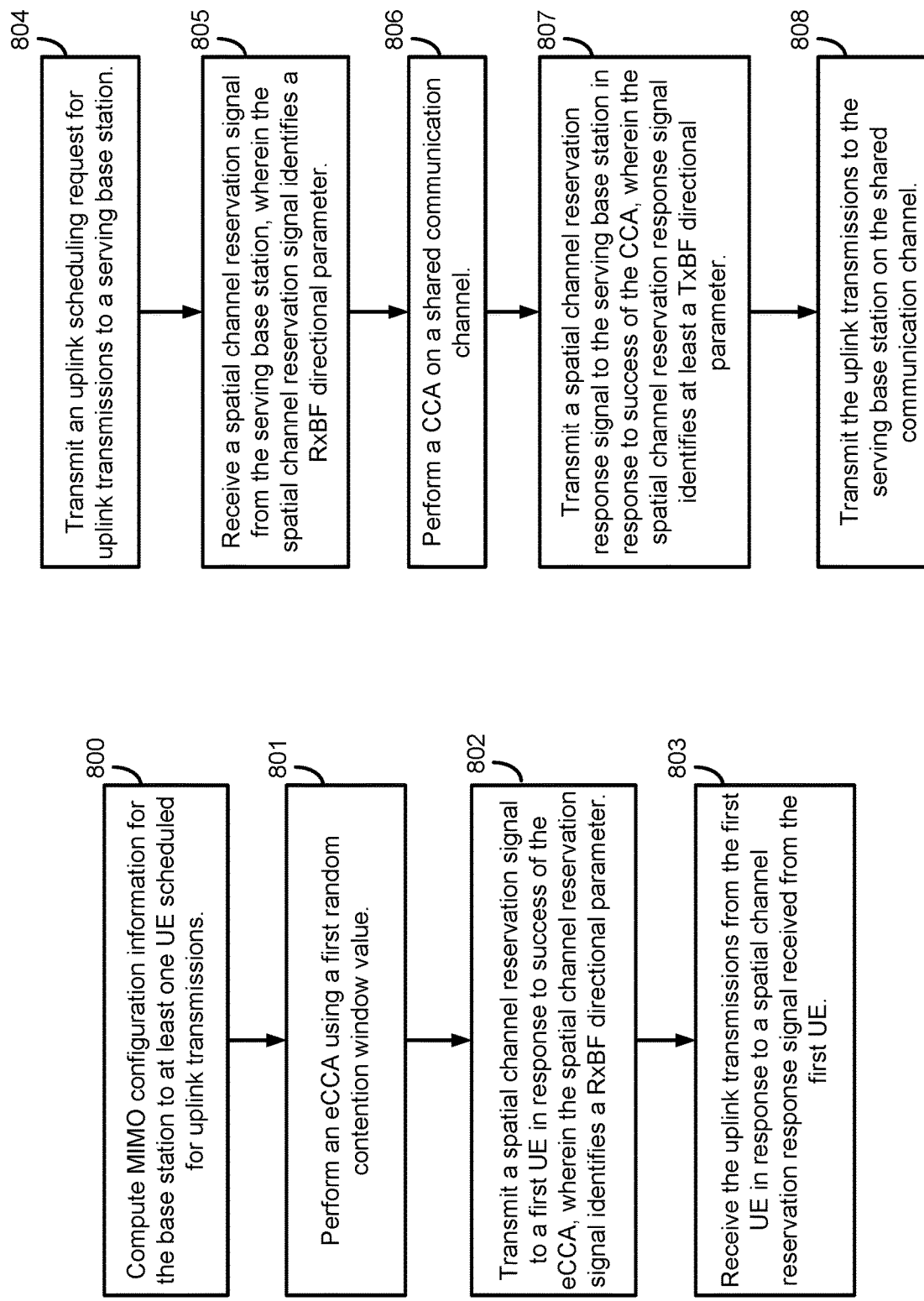
FIGS. 8A and 8B are block diagrams illustrating example blocks executed to implement one aspect of the present disclosure.

FIG. 8A is a block diagram illustrating example blocks executed by a base station to implement one aspect of the present disclosure for uplink transmissions. The example blocks will also be described with respect to base station 105 as illustrated in FIG. 15.

At block 800, a base station computes MIMO configuration information for the base station to at least one UE scheduled for uplink transmissions. The base station may have received a scheduling request from the UE previously and, consequently, scheduled the UE for uplink transmissions. When the base station begins to serve the UE for uplink, it draws a random number between 0 and CWmax for the eCCA. It also computes $W_T$, $W_R$, and MCS. Base station 105, under control of controller/processor 240, executes MIMO configuration logic 1502, stored in memory 242 to provide an execution environment for computation of the available MIMO configuration parameters. $W_T$ and $W_R$ may be computed from the channel estimate H, in the same fashion as described in the downlink process. For example, $W_T$ may be determined by selecting the left singular vectors of H. The rank may be computed using an instantaneous interference covariance, Rnn, received from the UE. For example, the rank may be computed as the one that results in the largest throughput for current interference covariance Rnn together with the corresponding minimum mean square error (MMSE) receiver. $W_R$ may be computed as the one that results in the largest throughput in searching for the optimum rank.

At block 801, the base station performs an eCCA using a first random contention window value. For example, base station 105, under control of controller/processor 240, executes eCCA/CCA logic 1503, stored in memory 242. The execution environment of eCCA/CCA logic 1503 provides the procedural steps that base station 105 executes in order to perform an eCCA or CCA. Base station 105 begins the eCCA by initiating a counter counting down from the first random contention window value to zero. Base station 105, under control of controller/processor 240, executes effective interference estimation logic 1503. The execution environment of effective interference estimation logic 1503 allows for base station 105 to compute, during eCCA, the effective interference it may experience based on uplink transmissions according to RxBF $W_R$. Base station 105 compares that effective interference with a pre-defined threshold (e.g., –72 dBm, –62 dBm, etc.) to determine whether to suspend the counter and eCCA process.

At block 802, the base station transmits a spatial channel reservation signal to a first UE in response to success of the eCCA, wherein the spatial channel reservation signal identifies a RxBF directional parameter. For example, base station 105, upon determining that the effective interference is within the threshold, triggers execution of spatial RTS generator 1505, stored in memory 242. The eCCA is identified as clear when the effective interference computed remains within the pre-defined threshold. Once clear, the base station transmits, via wireless radios 1500a-t and antennas 234a-t, RTS either with $W_T$ and $W_R$, including the TxBF and RxBF directional parameters and rank, embedded as payload or $W_T$ embedded as payload and the RTS pre-coded with $W_R$. Base station 105 may use a precoding flag 1506 to indicate whether the RTS is pre-coded or not for uplink transmissions.

At block 803, the base station receives the uplink transmissions from the first UE in response to a spatial channel reservation response signal received from the first UE. Base station 105 may receive a CTS in response to its RTS. After receiving the CTS, base station 105 may start to receive uplink transmissions in a constant-length transmission opportunity via antennas 234a-t and wireless radios 1500a-t. In some circumstances, the UE may not transmit CTS or base station 105 does not detect the CTS. When a CTS is not received or detected, a CTS time-out event is triggered that may lead to an increase in the CWmax for a next eCCA. In such a CTS time-out situation, base station 105 may continue to serve the UE for uplink after drawing another random number to begin the next eCCA.

FIG. 8B is a block diagram illustrating example blocks executed by a UE to implement one aspect of the present disclosure for uplink transmissions. The example blocks will also be described with respect to UE 115 as illustrated in FIG. 16.

At block 804, a UE transmits an uplink scheduling request for uplink transmissions to a serving base station. When the UE detects data in its data buffer 1607, it will trigger the uplink scheduling request. For example, UE 115 determines that uplink data is present in data buffer 1607, in memory 282. In response to determining that uplink data is available, UE 115, under control of controller/processor 280, executes uplink scheduling request logic 1601, stored in memory 282. The execution environment of uplink scheduling request logic 1601 triggers UE 115 to transmit a scheduling request to the serving base station via wireless radios 1600a-r and antennas 252a-r.

At block 805, the UE receives a spatial channel reservation signal from the serving base station, wherein the spatial channel reservation signal identifies a RxBF directional parameter. UE 115 may determine the MIMO configuration information, such as $W_T$ and $W_R$, including TxBF and RxBF directional parameters and rank, MCS, and the like. These MIMO configuration parameters may be embedded in the spatial RTS received from the base station or, with respect to the $W_R$, precoded into the RTS, and stored in memory 282 by UE 115 into MIMO configuration 1602.

At block 806, the UE performs a CCA on a shared communication channel. UE 115, under control of controller/processor 280, executes eCCA/CCA logic 1603, in memory 282. The execution environment of eCCA/CCA logic 1603 provides for UE 115 to conduct a CCA, looking back to history if available, and using the $W_T$ and rank to calculate the effective interference that its uplink transmissions may cause to any neighboring receivers. UE 115, under control of controller/processor 280, executes effective interference estimation logic 1604. The execution environment of effective interference estimation logic 1604 allows for UE 115 to determine the interference that neighboring receivers may experience in consideration of its uplink transmissions according to $W_T$. If the effective interference is expected to exceed a pre-defined threshold (e.g., more than –72 dBm or –62 dBm) to any on-going neighboring receivers, the UE may elect not to transmit CTS.

At block 807, the UE transmits a spatial channel reservation response signal to the serving base station in response to success of the CCA, wherein the spatial channel reservation response signal identifies at least a TxBF directional parameter. If the effective interference remains within the threshold, UE 115 responds by executing spatial CTS generator 1605, stored in memory 282. The execution environment of spatial CTS generator 1605 provides for transmitting a spatial CTS with $W_T$, including TxBF directional parameter and rank, embedded as payload or precoded into the CTS. UE 115 may send a precoding flag 1606 to indicate whether the CTS is precoded for uplink transmissions.

At block 808, the UE transmits the uplink transmissions to the serving base station on the shared communication channel. Once the eCCA is determined successful and UE 115 transmits the spatial CTS, it may begin the uplink transmissions of the uplink data in data buffer 1607 to the serving base station via wireless radios 1600a-r and antennas 252a-r.

Figure 9:
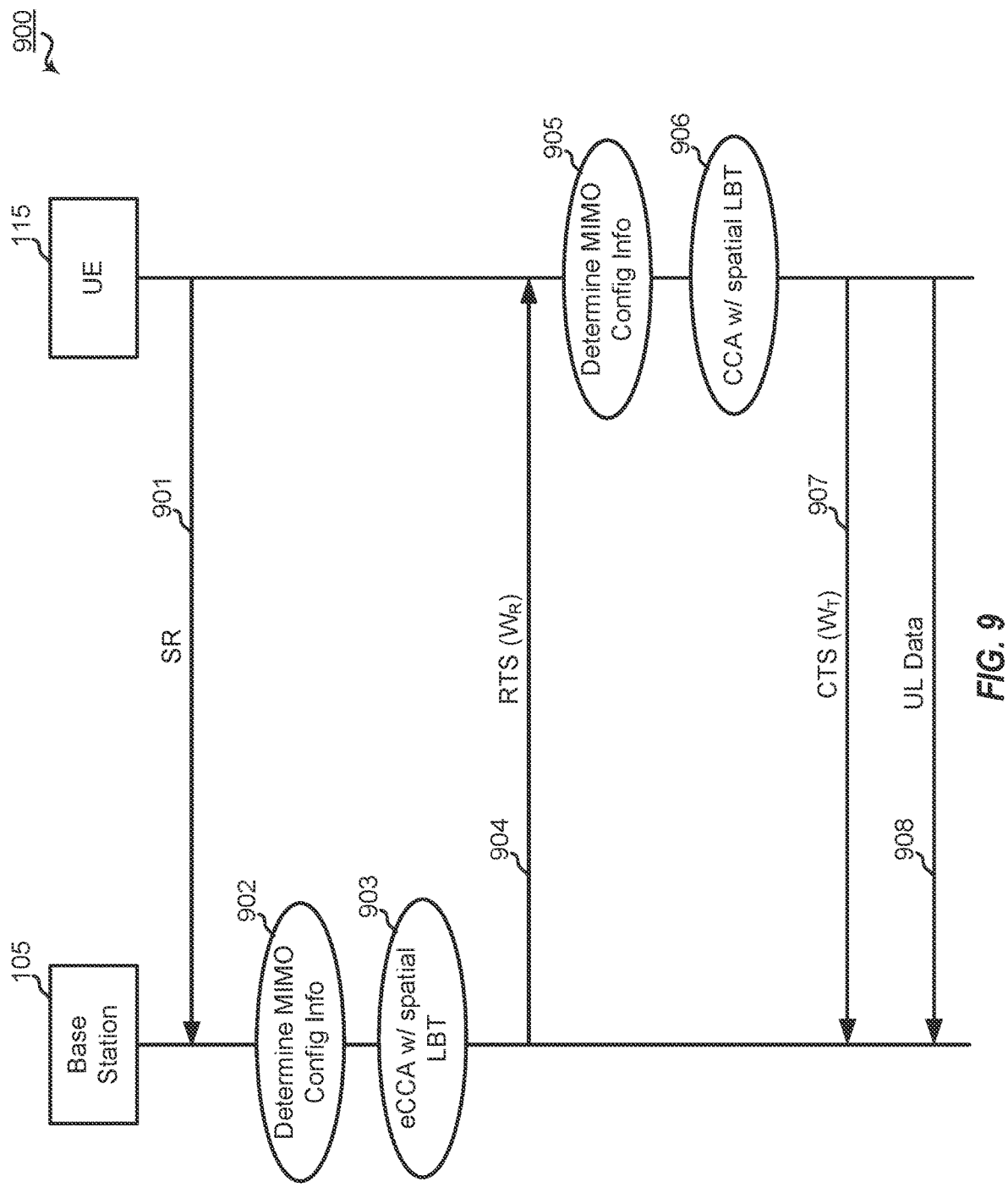
FIG. 9 is a call flow diagram illustrating an asynchronous spatial LBT procedure between a base station and UE configured according to one aspect of the present disclosure.

FIG. 9 is a call flow diagram illustrating an asynchronous spatial LBT procedure 900 between a base station 105 and UE 115 configured according to one aspect of the present disclosure. UE 115 may detect data in its uplink buffer ready for uplink transmissions. In response, at 901, UE 115 transmits a scheduling request to base station 105 to schedule UE 115 for uplink transmissions. At 902, base station 105 determines the MIMO configuration information. As described above, base station 105 calculates a channel estimate, H, based on the non-precoded SRS periodically requested from the served UEs, including UE 115. Base station 105 may calculate $W_T$ and $W_R$ based on this channel estimate H. Base station 105 may also determine rank and MCS using the transmit power and an instantaneous or current interference covariance, Rnn, received from the served UEs, including UE 115.

At 903, base station 105 performs eCCA with spatial LBT. Base station 105 computes the effective interference that it may see based on the selected rank and computed $W_R$. If this effective interference exceeds a pre-defined threshold, base station 105 may suspend the eCCA. Otherwise, base station 105 will transmit RTS at 904. The RTS will identify the $W_R$ either embedded as payload along with the other determined MIMO configuration parameters (e.g., $W_T$, MCS, etc.), or used to precode the RTS.

At 905, on receiving the RTS, UE 115 determines the MIMO configuration information. Generally, the MIMO configuration information, $W_R$, $W_T$, MCS, etc., is received from base station 105. However, in additional aspects, UE 115 may calculate its own rank and $W_T$. UE 115 may then perform CCA at 906 by calculating the effective interference using $W_T$. The effective interference calculated is with respect to any neighboring receivers that may be impacted by the uplink transmissions from UE 115. If the effective interference exceeds a pre-defined threshold (e.g., −72 dBm, −62 dBm, etc.), UE 115 will not send CTS. Otherwise, at 907, UE 115 will transmit CTS that identifies the $W_T$, either embedded as payload in the CTS or used to precode the CTS. UE 115 may further transmit a precoding flag that indicates whether the CTS is precoded for uplink transmissions. Once the CTS has been transmitted, UE 115 may begin sending uplink data to base station 105 at 908.

Figure 10:
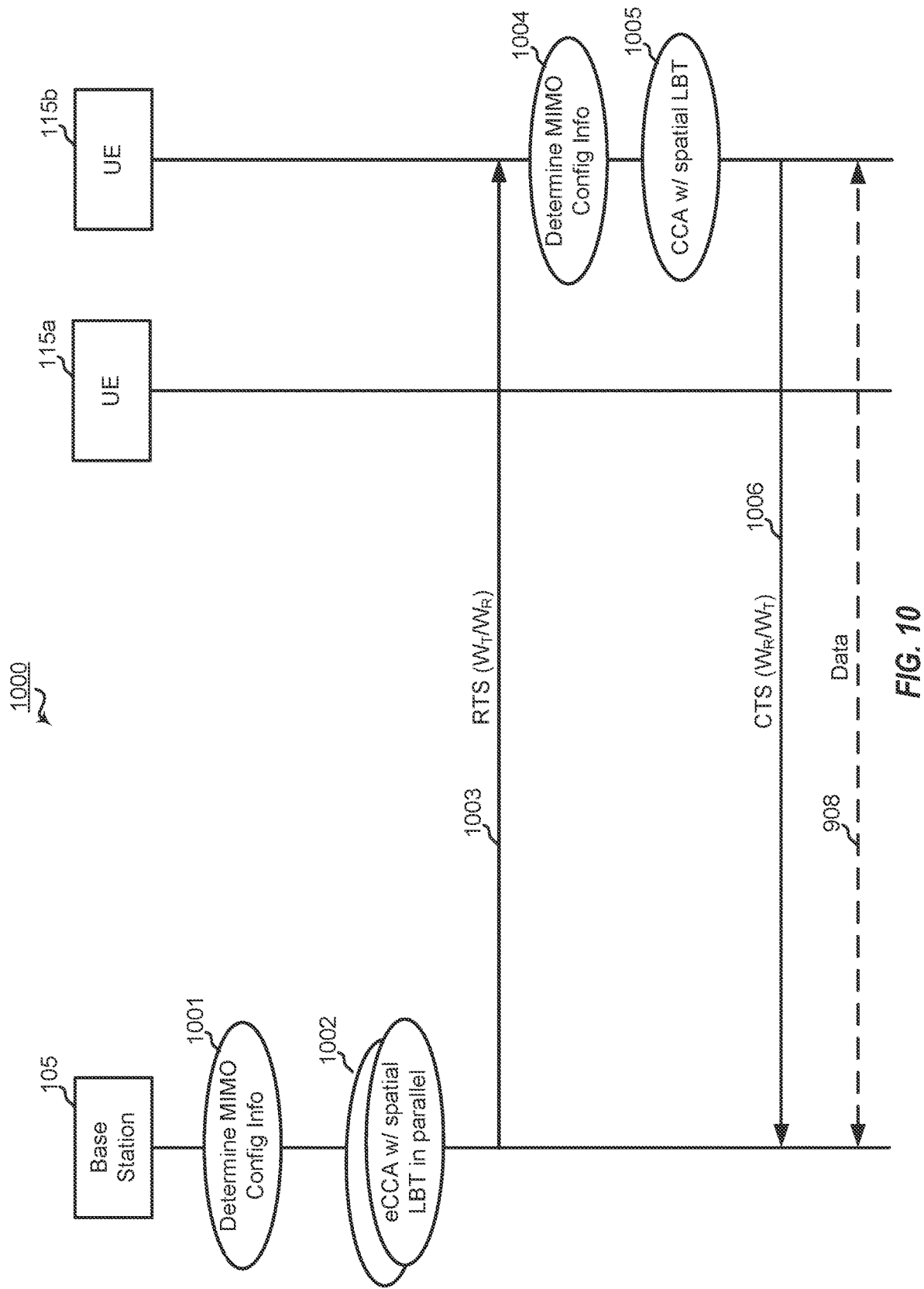
FIG. 10 is a block diagram illustrating an asynchronous spatial LBT procedure between base station and UEs configured according to one aspect of the present disclosure.

FIG. 10 is a block diagram illustrating an asynchronous spatial LBT procedure 1000 between base station 105 and UEs 115a and 115b configured according to one aspect of the present disclosure. Instead of choosing one UE to serve, a base station, such as base station 105 can conduct eCCA for multiple users in parallel, for example, multiple UEs in downlink, or multiple UEs in uplink, or multiple downlink UEs and multiple uplink UEs. When the same UE has both downlink and uplink opportunities, the single UE is treated as two eCCA UEs (one for the downlink opportunity, and another for the uplink opportunity).

As illustrated in asynchronous spatial LBT procedure 1000, base station 105 may serve both UEs 115a and 115b in either or both uplink or downlink transmission opportunities. At 1001, base station 105 determines the MIMO configuration information. As described above, base station 105 may determine $W_T$, $W_R$, and the like. In serving both UEs 115a and 115b, base station 105 conducts separate eCCA procedures in parallel at 1002 with spatial LBT. Base station 105 may use the same initial random contention window value for each of UEs 115a and 115b, or may use different respective initial random contention window value based on a priority or for quality of service (QoS) consideration. Base station 105 may maintain independent eCCA counters for each of UEs 115a and 115b.

In additional or alternative aspects, each of UEs 115a and 115b may have its own set of pre-determined $W_T$ and $W_R$ values which are fixed throughout their respective eCCA procedure. As each independent, parallel counter counts from the initial random contention window value, base station 105 may serve whichever of UE 115a or 115b whose eCCA counter arrives to zero first. When more than one UE's counter, such as the respective counters of both UE 115a and 115b arrive at zero at the same time, base station 105 may pick the UE for different reasons. For example, base station 105 may select the UE having the largest throughput, or the UE that has a higher priority with QoS considerations, or, if the capability is available, may serve them simultaneously using MU-MIMO.

After the parallel eCCA from 1002 result in the counter for UE 115b reaching zero first, base station 105 sends RTS at 1003 to UE 115b. Depending on whether base station 105 is serving UE 115b for uplink or downlink, the RTS at 1003 will identify, either by embedding or precoding, $W_T$ or $W_R$ into the RTS, as described above. UE 115b will determine the MIMO configuration information at 1004 and perform the CCA with spatial LBT at 1005, as described in several example aspects above. If the effective interference calculated using the MIMO configuration information remains within the pre-defined threshold, then at 1006, UE 115b transmits CTS identifying either $W_R$ or $W_T$, as described above, depending on whether uplink or downlink transmissions are being served by base station 105. Once UE 115b transmits the CTS, either base station 105 will begin transmitting downlink data to UE 115b at 908 or UE 115b will begin transmitting uplink data to base station 105 also at 908.

Figure 11A:
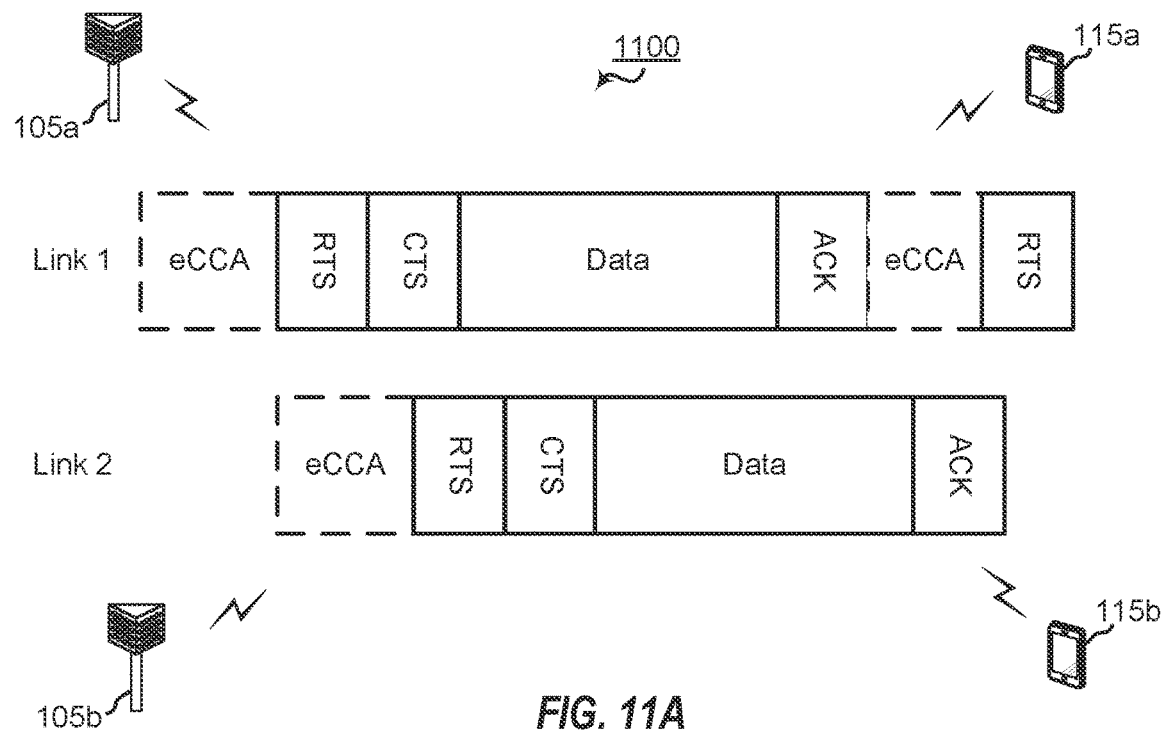
FIG. 11A is a block diagram illustrating two transmitter-receiver pairs performing shared access procedure to a shared communication channel via a contention-based access to the channel.

FIG. 11A is a block diagram illustrating two transmitter-receiver pairs performing shared access procedure 1100 to a shared communication channel via a contention-based access to the channel. A deafness issue may arise in a shared communications channel when a first transmitter-receiver pair cannot hear operational information transmitted by the second transmitter-receiver pair. Base station 105a communicates with UE 115a using Link 1 over the shared communication channel. In a legacy communications process, base station 105a performs eCCA and transmits RTS when successful. UE 115a responds with CTS after which base station 105a transmits downlink data to UE 115a over the constant-length transmission opportunity. After the data transmission, a block ACK period allows UE 115a to acknowledge reception of the data.

Base station 105b communicates with UE 115b on Link 2 of the shared communications channel. As the second transmitter-receiver pair, base station 105b performs eCCA while base station 105a and UE 115a are exchanging RTS/CTS. Thus, base station 105b is able to detect the transmission information conveyed in RTS/CTS and determine whether or not it may proceed with spatial communications with UE 115b without causing too much interference to UE 115a as a receiver of downlink transmissions from base station 105a. However, when base station 105b and UE 115b exchange RTS/CTS over Link 2, base station 105a is transmitting and, therefore, cannot obtain any of the transmission information that may be included in the RTS/CTS process. Thus, if base station 105a has additional data to transmit after the constant-length transmission opportunity, it would perform a subsequent eCCA without the knowledge of the transmission information associated with Link 2. Therefore, base station 105a may not be able to perform a full spatial LBT on the shared communication channel. This may result in delayed communications between base station 105a and UE 115a or may cause base station 105a to not use full or even close to full rank for the second transmission opportunity.

Figure 11B:
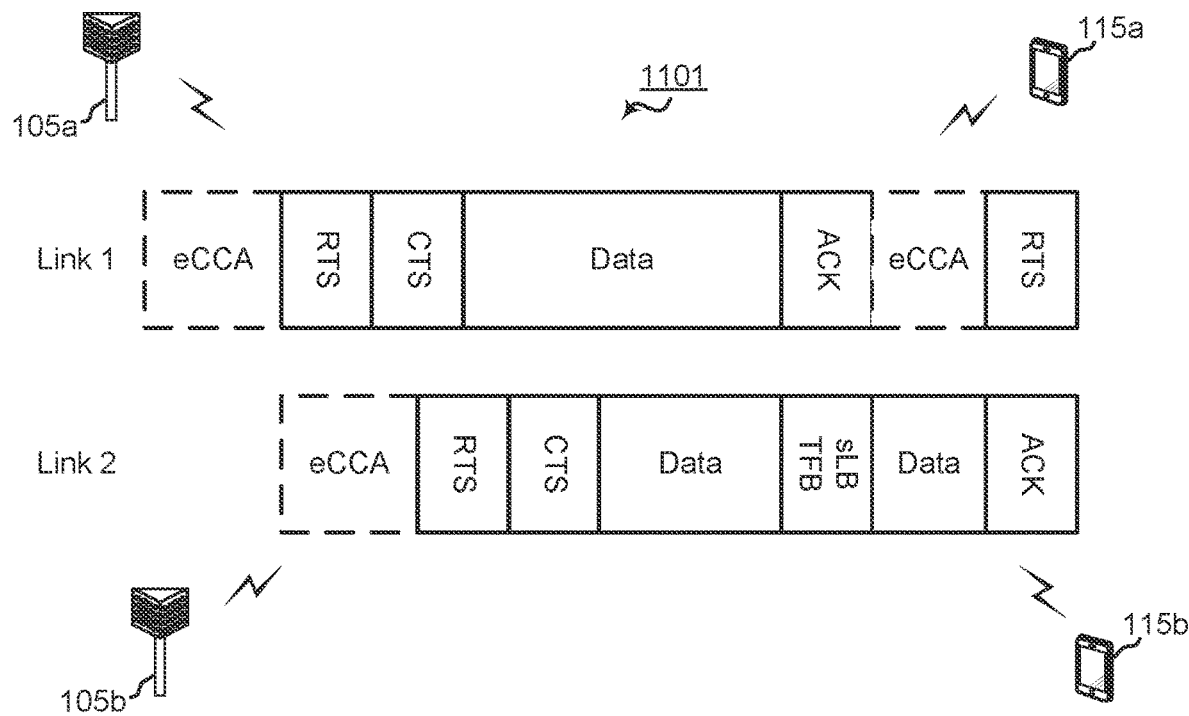
FIG. 11B is a block diagram illustrating two transmitter-receiver pairs performing shared access procedure according to one aspect of the present disclosure.

FIG. 11B is a block diagram illustrating two transmitter-receiver pairs performing shared access procedure 1101 according to one aspect of the present disclosure. Shared access procedure 1101 uses a contention-based access procedure for sharing access to the channel. According to shared access procedure 1101, as the first transmitter-receiver pair, base station 105a performs eCCA using spatial LBT when initiating downlink communications with UE 115a. After detecting a successful eCCA, base station 105a and UE 115a exchange RTS/CTS. However, within the RTS/CTS signaling, the frame structure of Link 1 is identified. Thus, the frame structure signaling identifies what direction the transmission frame is scheduled, the location of the block acknowledgement, and the like.

The second transmitter-receiver pair, base station 105*b* and UE 115*b* of Link 2, detects the frame structure signaling regarding Link 1 and may schedule its own transmissions to avoid the deafness problem illustrated in FIG. 11A. For example, base station 105*b* detects the frame structure and, after successfully completing eCCA and exchanging RTS/CTS with UE 115*b*, it begins downlink spatial transmissions to UE 115*b*. However, downlink transmissions from base station 105*b* are suspended at the time or times identified for the block acknowledgment in Link 1. At these times, UE 115*b* transmits a spatial LBT feedback block (sLBTFB) in Link 2. The sLBTFB is transmitted by the Link 2 data receiver, UE 115*b*, especially when the communications on Link 2 between base station 105*b* and UE 115*b* are using full or close-to-full rank spatial transmissions. sLBTFB can be used to carry the precoded CTS when Link 2, as illustrated, is performing downlink from base station 105*b* or, in additional aspects, precoded RTS from base station 105*b* if performing uplink transmissions from UE 115*b*. The sLBTFB can also carry fast ACK/NAK/CQI.

It should be noted that, when the exact or close alignment between Link 1 and Link 2 is not possible, the sLBTFB can be transmitted more frequently at the cost of overhead. Moreover, when no sLBTFB is present or possible, Link 1 may revert to communications between base station 105*a* and UE 115*a* without using a full or close-to-full rank in the second transmission opportunity.

FIGS. 12A and 12B are block diagrams illustrating example blocks executed to implement aspects of the present disclosure. The example blocks will also be described with respect to base station 105 and UE 115, as illustrated in FIGS. 15 and 16, respectively.

In order to address the potential deafness issue, at block 1200, a base station detects a frame structure signal within the channel reservations signaling between a neighboring transmitter and a neighboring receiver. The neighboring transmitter-receiver pair include this frame structure signal as a part of the channel reservation RTS/CTS signals. Base station 105 receives the signals from the neighboring transmitter-receiver pair, via antennas 234*a-t* and wireless radios 1500*a-t*, while monitoring the shared communication channel. Base station 105 stores the frame structure in memory 242 at neighbor frame structure 1508.

At blocks 1201 and 1204, the transmitter node (1201) and receiver node (1204) exchange precoded spatial channel reservation signaling over the shared communication channel. The spatial RTS/CTS signaling from the transmitter and receiver nodes are exchanged after the transmitter performs a successful eCCA using a spatial LBT procedure. For example, base station 105, under control of controller/processor 240, executes spatial RTS generator 1505, while UE 115, under control of controller/processor 280, executes spatial CTS generator 1603, in response to receiving RTS from base station 105.

It should be noted that base station 105 and UE 115 may each perform eCCA/CCA using effective interference computations, as described above, with respect to eCCA/CCA logic 1504 and effective interference estimation logic 1503, for base station 105, and eCCA/CCA logic 1603 and effective interference estimation logic 1604, for UE 115.

At block 1202, the transmitter node schedules transmission of a spatial LBT feedback block (sLBTFB) during one or more receiving periods of the neighboring transmitter indicated in the frame structure signaling. Using the frame structure information at neighbor frame structure 1508, the transmitter establishes a transmission schedule, via scheduler 244, with the receiver in order to accommodate the transmission schedule and frame structure of the neighboring transmitter-receiver pair.

At block 1203, the transmitter transmits data to the receiver node after the exchanging of the precoded spatial channel reservation signaling, wherein the transmitting the data is suspended during the receiving periods of the neighboring transmitter. The transmitter transmits, via wireless radios 1500*a-t* and antennas 234*a-t*, the data in data buffer 1507 once the precoded spatial channel reservation signaling has been exchanged. However, the transmissions may be scheduled to pause during the times identified in the frame structure for the neighboring transmitter to receive.

At block 1205, the receiver node receives data on the shared communication channel transmitted from the transmitter node after the exchanging. For example, when UE 115 is the receiver node, UE 115 receives the downlink data via antennas 252*a-r* and wireless radios 1600*a-r*.

At block 1206, the receiver transmits a sLBTFB during the one or more receiver periods of the neighboring transmitter indicated by the frame structure signaling, wherein the receiving the data from the transmitter node is suspended during the transmitting of the sLBTFB. In order to avoid the deafness of the neighboring transmitter-receiver pair, during the receiving periods identified by the frame structure signals, the transmitter schedules the receiver to transmit the sLBTFB signal. The receiver, such as UE 115, transmits the sLBTFB via wireless radios 1600*a-r* and antennas 234*a-t*. The transmitter suspends any transmissions in order for the receiver to do this. As described above, the sLBTFB may include precoded RTS/CTS, which may be provided via spatial RTS generator 1505, when base station 105 is the receiver, or spatial CTS generator 1605, when UE 115 is the receiver, depending on whether the data transmission is uplink or downlink, and may also carry fast ACK/NAK/CQI.

It should be noted that either base station 105 or UE 115 may be the receiver or transmitter in example implementations. While base station 105 will be the node to detect the frame structure and schedule transmissions of sLBTFB, the sLBTFB would be transmitted by base station 105 if it is the receiver, or by UE 115 if it is the receiver.

Figures 13A, 13B:
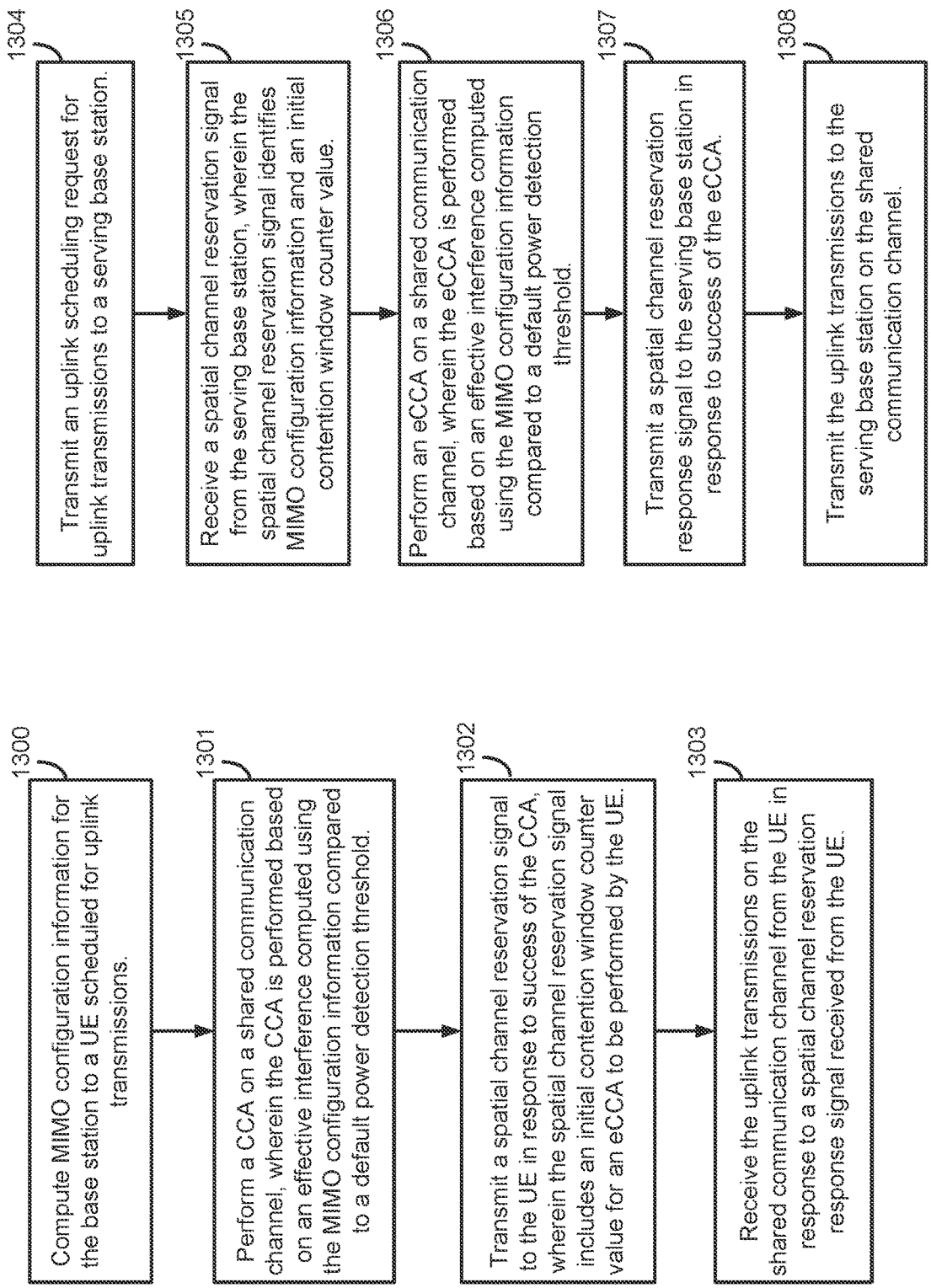
FIGS. 13A and 13B are block diagrams illustrating example blocks executed to implement one aspect of the present disclosure.

FIG. 13A is a block diagram illustrating example blocks executed to implement one aspect of the present disclosure. The example blocks will also be described with respect to base station 105 as illustrated in FIG. 15. Various additional aspects of the present disclosure provide for a more flexible procedure for uplink transmissions.

At block 1300, a base station computes MIMO configuration information for the base station to a UE scheduled for uplink transmissions, wherein the MIMO configuration information is based at least in part on a channel estimate and a current interference covariance from the UE. Base station 105, under control of controller/processor 240, executes MIMO configuration logic 1502, stored in memory 242 to provide an execution environment for computation of the available MIMO configuration parameters, as described above.

At block 1301, the base station performs a CCA on a shared communication channel, wherein the CCA is performed based on an effective interference computed using the MIMO configuration information compared to a default power detection threshold. For example, base station 105, under control of controller/processor 240, executes eCCA/

CCA logic 1503, stored in memory 242. The execution environment of eCCA/CCA logic 1503 provides the procedural steps that base station 105 executes in order to perform the CCA. Base station 105, under control of controller/processor 240, executes effective interference estimation logic 1503. The execution environment of effective interference estimation logic 1503 allows for base station 105 to compute, during CCA, the effective interference it may experience based on uplink transmissions according to RxBF $W_R$. Base station 105 compares that effective interference with a pre-defined threshold (e.g., −72 dBm, −62 dBm, etc.) to determine whether to suspend the counter and eCCA process.

At block 1302, the base station transmits a spatial channel reservation signal to the UE in response to success of the CCA, wherein the spatial channel reservation signal includes an initial contention window counter value for an eCCA to be performed by the UE. For example, base station 105, upon determining that the effective interference is within the threshold, triggers execution of spatial RTS generator 1505, stored in memory 242. Thus, base station 105 performs a CCA procedure to secure the shared channel while providing the initial contention window counter value for the UE in the RTS to perform an eCCA procedure. Base station 105 may further provided for a non-precoded CSI-RS within the RTS, which would allow the UE to calculate its own $W_T$ using a rank also included in the RTS.

At block 1303, the base station receives the uplink transmissions on the shared communication channel from the UE in response to a spatial channel reservation response signal received from the UE. After receiving the CTS, base station 105 may start to receive uplink transmissions in a constant-length transmission opportunity via antennas 234*a-t* and wireless radios 1500*a-t*.

FIG. 13B is a block diagram illustrating example blocks executed to implement one aspect of the present disclosure. The example blocks will also be described with respect to UE 115 as illustrated in FIG. 16. From the UE perspective, the more flexible uplink procedure allows the UE to calculate its own MIMO configuration parameters based on parameters received from the base station via RTS.

At block 1304, a UE transmits an uplink scheduling request for uplink transmissions to a serving base station. When the UE detects data in its data buffer 1607, it will trigger the uplink scheduling request. For example, UE 115 determines that uplink data is present in data buffer 1607, in memory 282. In response to determining that uplink data is available, UE 115, under control of controller/processor 280, executes uplink scheduling request logic 1601, stored in memory 282. The execution environment of uplink scheduling request logic 1601 triggers UE 115 to transmit a scheduling request to the serving base station via wireless radios 1600*a-r* and antennas 252*a-r*.

At block 1305, the UE receives a spatial channel reservation signal from the serving base station, wherein the spatial channel reservation signal identifies MIMO configuration information and an initial contention window counter value. The RTS received by UE 115 via antennas 252*a-r* and wireless radios 1600*a-r*, may include various MIMO configuration information, such as $W_T$, $W_R$, and the like, which UE 115 may store in MIMO configuration 1602 in memory 282. UE 115 may be allowed to use a subspace of $W_T$ further indicated by the base station in the RTS as a part of the MIMO configuration information. Using the other information received in the RTS, UE 115 would be able to calculate its own $W_T$ using the rank and a non-precoded CSI-RS transmitted within RTS and store in MIMO configuration 1602.

At block 1306, the UE performs a CCA on a shared communication channel, wherein the CCA is performed based on an effective interference computed using the MIMO configuration information compared to a default power detection threshold. UE 115, under control of controller/processor 280, executes eCCA/CCA logic 1603, in memory 282. The execution environment of eCCA/CCA logic 1603 provides for UE 115 to conduct a CCA, looking back to history if available, and using the $W_T$ and rank to calculate the effective interference that its uplink transmissions may cause to any neighboring receivers. UE 115, under control of controller/processor 280, executes effective interference estimation logic 1604. The execution environment of effective interference estimation logic 1604 allows for UE 115 to determine the interference that neighboring receivers may experience in consideration of its uplink transmissions according to $W_T$. If the effective interference is expected to exceed a pre-defined threshold (e.g., more than −72 dBm or −62 dBm) to any on-going neighboring receivers, the UE may elect not to transmit CTS.

At block 1307, the UE transmits a spatial channel reservation response signal to the serving base station in response to success of the eCCA. If the effective interference remains within the threshold, UE 115 responds by executing spatial CTS generator 1605, stored in memory 282. The execution environment of spatial CTS generator 1605 provides for transmitting a spatial CTS with $W_T$, including TxBF directional parameter and rank, embedded as payload or precoded into the CTS. UE 115 may send a precoding flag 1606 to indicate whether the CTS is precoded for uplink transmissions.

At block 1308, the UE transmits the uplink transmissions to the serving base station on the shared communication channel. Once the channel reservation signaling of RTS/CTS is exchanged, the uplink transmissions may begin from the UE. Once the eCCA is determined successful and UE 115 transmits the spatial CTS, it may begin the uplink transmissions of the uplink data in data buffer 1607 to the serving base station via wireless radios 1600*a-r* and antennas 252*a-r*.

Figure 14:
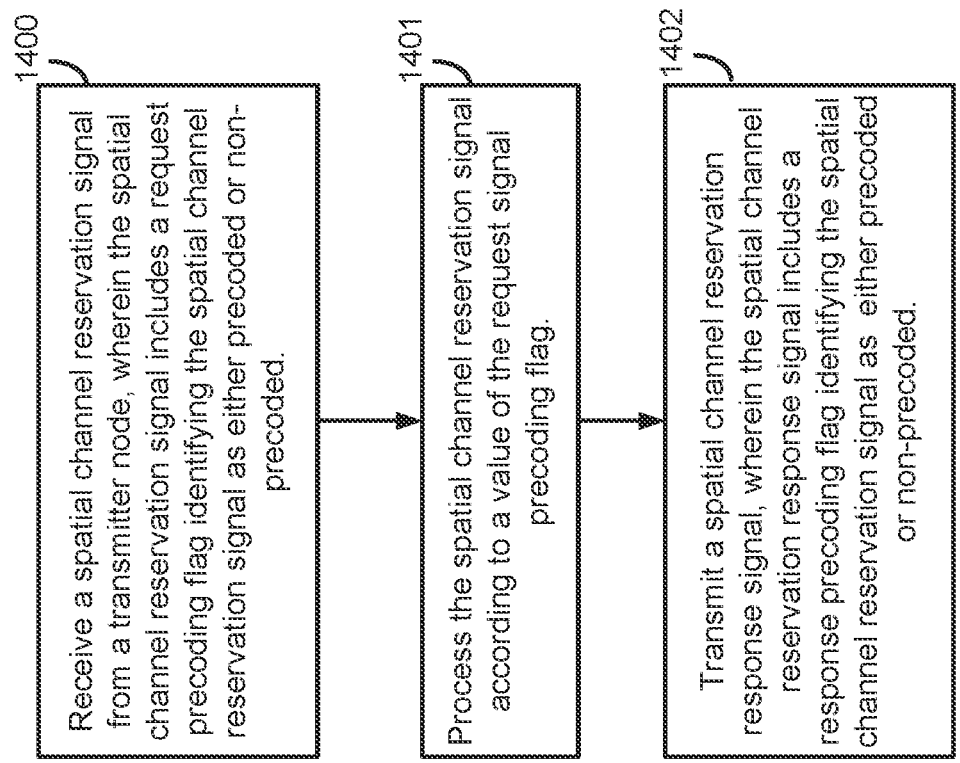
FIG. 14 is a block diagram illustrating example blocks executed to implement one aspect of the present disclosure.

FIG. 14 is a block diagram illustrating example blocks executed to implement one aspect of the present disclosure. The example blocks will also be described with respect to base station 105 and UE 115, as illustrated in FIGS. 15 and 16, respectively. Various aspects of the present disclosure provide an ability of the transmitter or receiver to precode the RTS/CTS with the beamforming matrix (e.g., $W_T$ or $W_R$). One solution for signaling such precoding may be through a precoding flag.

At block 1400, a receiver node receives a spatial channel reservation signal from a transmitter node, wherein the spatial channel reservation signal includes a request precoding flag identifying the spatial channel reservation signal as one of: precoded or non-precoded. For example, a UE receiver node, UE 115, may receive an RTS from a serving base station via antennas 252*a-r* and wireless radios 1600*a-r*, or a receiver base station, base station 105, may receive a CTS from a UE via antennas 234*a-t* and wireless radios 1500*a-t*.

At block 1401, the receiver node processes the spatial channel reservation signal according to a value of the request signal precoding flag. For example, a receiver UE 115 may decode the RTS from the base station in wireless radios 1600*a-r* to specifically decode the precoded beamforming matrix from the RTS. Similarly, a receiver base station 105 may decode the CTS from the UE in wireless radios 1500*a-t* to specifically decode the precoded beamforming matrix from the CTS.

At block 1402, the receiver node transmits a spatial channel reservation response signal, wherein the spatial channel reservation response signal includes a response precoding flag identifying the spatial channel reservation signal as one of: precoded or non-precoded. For example, a receiver UE 115 may transmit its CTS, via execution of spatial CTS generator 1605, as described above, which includes precoding flag 1606, to identify whether the CTS is precoded or not. Similarly, a receiver base station 105, which initiates the channel reservation process with the spatial channel reservation response signal, RTS, via execution of spatial RTS generator 1505, as described above, which includes precoding flag 1506, to identify whether the RTS is precoded or not.

As the transmitter-receiver pair exchange such channel reserving signals, the availability of the precoding of the beamforming matrix into the RTS/CTS may be conveyed to the other communication pair using the precoding flag. The receiving communication node may then know to decode the RTS/CTS for the precoded beamforming matrix or use a different means to obtain the MIMO configuration information if the flag indicates the RTS/CTS is not precoded and the signal does not include the beamforming matrix as payload.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6A, 6B, 8A, 8B, 12A, 12B, 13A, 13B, and 14 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A base station configured for wireless communication, the base station comprising:
    at least one processor; and
    a memory coupled to the at least one processor,
    wherein the at least one processor is configured to:
        request a non-precoded sounding reference signal (SRS) from one or more served user equipments (UEs) at one or more intervals;
        determine a channel estimate to each of the one or more served UEs using the non-precoded SRS received from the one or more served UEs;
        compute multiple input, multiple output (MIMO) configuration information for the base station based on one or more of the channel estimate and a running average of interference covariance, Rnn, from the one or more served UEs;
        perform an enhanced clear channel assessment (eCCA) using a first random contention window value, wherein the eCCA is performed on a shared communication channel;
        transmit a spatial channel reservation signal on the shared communication channel to at least one of the one or more served UEs in response to success of the eCCA, wherein the spatial channel reservation signal identifies the MIMO configuration information, including at least a transmit beamforming (TxBF) directional parameter; and
        transmit data on the shared communication channel to the at least one of the one or more served UEs in response to a spatial channel reservation response signal received from the at least one of the one or more served UEs.

2. The base station of claim 1,
    wherein the one or more intervals include one of:
        one or more periodic intervals; or
        one or more aperiodic intervals, and
    wherein MIMO configuration information includes one or more of:
        a MIMO rank;
        a number of transmit antennas;
        a number of receive antennas;
        the TxBF directional parameter; and
        a receive beamforming (RxBF) directional parameter.

3. The base station of claim 2, wherein the configuration of the at least one processor to compute the MIMO configuration information includes configuration of the at least one processor to one or more of:
    compute the TxBF directional parameter using the channel estimate only;
    determine the MIMO rank using a transmit power and the running average of interference covariance, Rnn; and
    compute the TxBF directional parameter by selecting the right singular vectors of a singular-value decomposition (SVD) of the channel estimate.

4. The base station of claim 2, wherein the configuration of the at least one processor to perform the eCCA includes configuration of the at least one processor to:
    compute an effective interference to one or more neighboring receiver nodes using at least the TxBF directional parameter and MIMO rank of the MIMO configuration information;
    compare the effective interference with a default power detection threshold, wherein the effective interference being within the default power detection threshold identifies the success of the eCCA; and
    suspend the eCCA in response to the effective interference exceeding the default power detection threshold.

5. The base station of claim 2, wherein the TxBF directional parameter is identified by the spatial channel reservation signal via one of:
    embedding the TxBF directional parameter and MIMO rank into a payload of the spatial channel reservation signal; or
    precoding the spatial channel reservation signal using the TxBF directional parameter and MIMO rank.

6. The base station of claim 5, further including configuration of the at least one processor to signal a precoding flag to the at least one of the one or more served UEs identifying that the spatial channel reservation signal is precoded.

7. The base station of claim 2, wherein the spatial channel reservation response signal identifies a channel quality indicator (CQI), the RxBF directional parameter, and MIMO rank.

8. The base station of claim 7, wherein the RxBF directional parameter is identified by the spatial channel reservation response signal via one of:
    the RxBF directional parameter and MIMO rank embedded into a payload of the spatial channel reservation response signal; or
    the spatial channel reservation response signal precoded using the RxBF directional parameter and MIMO rank, wherein the base station receives a precoding flag from the at least one of the one or more served UEs identifying that the spatial channel reservation response signal is precoded.

9. The base station of claim 1, further including configuration of the at least one processor to:
    fail to detect the spatial channel reservation response signal;
    select a second random contention window counter in response to the failing to detect; and
    perform a second eCCA on the shared communication channel using the second random contention window value.

10. The base station of claim 1, further including configuration of the at least one processor to identify data for downlink transmissions to a plurality of UEs of the at least one of the one or more served UEs, wherein the configuration of the at least one processor to perform the eCCA includes configuration of the at least one processor to perform the eCCA for each of the plurality of UEs in parallel.

11. The base station of claim 10, further including configuration of the at least one processor to:
    initiate an eCCA counter at the first random contention window value for each of the plurality of UEs in parallel, wherein the first random contention window value is one of:

a same value for each of the plurality of UEs; or
an assigned value based on a priority of each of the plurality of UEs.

12. The base station of claim 11, wherein the transmission of the spatial channel reservation signal and the data is to a first UE having the eCCA counter expire first.

13. The base station of claim 12,
wherein the one or more first UEs include two or more UEs, and
wherein the configuration of the at least one processor to transmit the data includes configuration of the at least one processor to:
transmit the data to a first UE having a largest estimated throughput of the two or more UEs; or
transmit the data to the first UE having a higher priority of the two or more UEs;
transmit the data to the two or more UEs using multi-user MIMO transmissions.

14. A user equipment (UE) configured for wireless communication, the UE comprising:
at least one processor; and
a memory coupled to the at least one processor,
wherein the at least one processor is configured to:
receive a spatial channel reservation signal from a serving base station, wherein the spatial channel reservation signal identifies multiple input, multiple output (MIMO) configuration information, including at least a transmit beamforming (TxBF) parameter;
perform a clear channel assessment (CCA) on a shared communication channel;
transmit a spatial channel reservation response signal to the serving base station in response to success of the CCA, wherein the spatial channel reservation response signal identifies at least a receive beamforming (RxBF) directional parameter; and
receive, after transmission of the spatial channel reservation response signal, data transmissions from the serving base station on the shared communication channel.

15. The UE of claim 14,
wherein MIMO configuration information includes one or more of:
a MIMO rank;
a number of transmit antennas;
a number of receive antennas;
the TxBF directional parameter; and
the RxBF directional parameter,
wherein the configuration of the at least one processor to perform the CCA includes configuration of the at least one processor to:
compute, by the UE, an effective interference experienced by the UE using at least the TxBF directional parameter and MIMO rank of the MIMO configuration information;
compare, by the UE, the effective interference with a default power detection threshold, wherein the effective interference being within the default power detection threshold identifies the success of the CCA; and
refrain, by the UE, from transmission of the spatial channel reservation response signal in response to the effective interference exceeding the default power detection threshold, and
wherein the TxBF directional parameter is identified by the spatial channel reservation signal via one of:

the TxBF directional parameter and MIMO rank embedded into a payload of the spatial channel reservation signal; or
the spatial channel reservation signal precoded using the TxBF directional parameter and MIMO rank.

16. The UE of claim 15, further including:
receiving, by the UE, a precoding flag from the serving base station identifying that the spatial channel reservation signal is precoded.

17. The UE of claim 16,
wherein the spatial channel reservation response signal identifies the RxBF directional parameter, and
wherein the RxBF directional parameter is identified by the spatial channel reservation response signal via one of:
embedding the RxBF directional parameter and MIMO rank into a payload of the spatial channel reservation response signal; or
precoding the spatial channel reservation response signal using the RxBF directional parameter and MIMO rank, wherein the UE transmits a precoding flag to the serving base station identifying that the spatial channel reservation response signal is precoded for downlink transmissions.

18. A base station configured for wireless communication, the base station comprising:
at least one processor; and
a memory coupled to the at least one processor,
wherein the at least one processor is configured to:
compute multiple input, multiple output (MIMO) configuration information for a shared communication channel between the base station and at least one user equipment (UE) scheduled for uplink transmissions, wherein the MIMO configuration information is based one or more of a channel estimate and a current interference covariance, Rnn, from the at least one UE;
perform an enhanced clear channel assessment (eCCA) using a first random contention window value, wherein the eCCA is performed on the shared communication channel;
transmit a spatial channel reservation signal on the shared communication channel to a first UE of the at least one UE in response to success of the eCCA, wherein the spatial channel reservation signal identifies the MIMO configuration information, including at least a receive beamforming (RxBF) directional parameter; and
receive the uplink transmissions from the first UE on the shared communication channel in response to a spatial channel reservation response signal received from the first UE.

19. The base station of claim 18,
wherein MIMO configuration information includes one or more of:
a MIMO rank;
a number of transmit antennas;
a number of receive antennas;
a transmit beamforming (TxBF) directional parameter; and
the RxBF directional parameter,
wherein the configuration of the at least one processor to compute the MIMO configuration information includes configuration of the at least one processor to:
select the MIMO rank resulting in a largest throughput from the at least one UE based on the current interference covariance, Rnn;

select the RxBF directional parameter resulting in the largest throughput from the at least one UE based on the selected MIMO rank; and
compute the TxBF directional parameter by selecting left singular vectors of a singular-value decomposition (SVD) of a channel estimate,
wherein performing the eCCA includes:
compute an effective interference at the base station using at least the RxBF directional parameter and MIMO rank of the MIMO configuration information;
compare the effective interference with a default power detection threshold, wherein the effective interference being within the default power detection threshold identifies the success of the eCCA; and
suspend the eCCA in response to the effective interference exceeding the default power detection threshold, and
wherein the RxBF directional parameter is identified by the spatial channel reservation signal via one of:
the RxBF directional parameter and MIMO rank embedded into a payload of the spatial channel reservation signal; or
the spatial channel reservation signal precoded using the RxBF directional parameter and MIMO rank.

20. The base station of claim 19, further including configuration of the at least one processor to:
signal a precoding flag to the at least one UE identifying that the spatial channel reservation signal is precoded for uplink transmissions.

21. The base station of claim 18, wherein the spatial channel reservation response signal identifies the TxBF directional parameter.

22. The base station of claim 21, wherein the TxBF directional parameter is identified by the spatial channel reservation response signal via one of:
the TxBF directional parameter and MIMO rank embedded in a payload of the spatial channel reservation response signal; or
the channel reservation response signal precoded with the second TxBF directional parameter and MIMO rank, wherein the base station receives a precoding flag from the first UE identifying that the spatial channel reservation response signal is precoded.

23. The base station of claim 18, further including configuration of the at least one processor to:
receive an uplink scheduling request from the at least one UE;
schedule the first UE for the uplink transmissions;
fail to detect the spatial channel reservation response signal;
select a second random contention window counter in response to the failing to detect; and
perform a second eCCA on the shared communication channel using the second random contention window value.

24. The base station of claim 23,
wherein the uplink scheduling request is received from a plurality of UEs of the at least one UE, wherein the configuration of the at least one processor to perform the eCCA includes configuration of the at least one processor to perform the eCCA for each of the plurality of UEs in parallel.

25. The base station of claim 23, further including configuration of the at least one processor to:

initiate an eCCA counter at the first random contention window value for each of the plurality of UEs in parallel, wherein the first random contention window value is one of:
a same value for each of the plurality of UEs; or
an assigned value based on a priority of each of the plurality of UEs,
wherein the first UE includes the one of the plurality of UEs having the eCCA counter expire first.

26. The base station of claim 25,
wherein the one or more first UEs include two or more UEs, and
wherein the configuration of the at least one processor to receive the uplink transmissions includes configuration of the at least one processor to:
receive the uplink transmissions from a first UE having a largest estimated throughput of the two or more UEs;
receive the uplink transmissions from the first UE having a higher priority of the two or more UEs; or
receive the uplink transmissions from the two or more UEs using multi-user MIMO transmissions.

27. A user equipment (UE) configured for wireless communication, the UE comprising:
at least one processor; and
a memory coupled to the at least one processor,
wherein the at least one processor is configured to:
transmit an uplink scheduling request for uplink transmissions to a serving base station;
receive a spatial channel reservation signal from the serving base station, wherein the spatial channel reservation signal identifies multiple input, multiple output (MIMO) configuration information, including at least a receive beamforming (RxBF) directional parameter;
perform a clear channel assessment (CCA) on a shared communication channel;
transmit a spatial channel reservation response signal to the serving base station in response to success of the CCA, wherein the spatial channel reservation response signal identifies at least a transmit beamforming (TxBF) directional parameter; and
transmit, after transmission of the spatial channel reservation response signal, the uplink transmissions to the serving base station on the shared communication channel.

28. The UE of claim 27,
wherein MIMO configuration information includes one or more of:
a MIMO rank;
a number of transmit antennas;
a number of receive antennas;
the TxBF directional parameter; and
the RxBF directional parameter,
wherein the configuration of the at least one processor to perform the CCA includes configuration of the at least one processor to:
compute an effective interference to one or more neighboring receiver nodes using at least the TxBF directional parameter and MIMO rank of the MIMO configuration information;
compare the effective interference with a default power detection threshold, wherein the effective interference being within the default power detection threshold identifies the success of the CCA; and refrain from transmission of the spatial channel reservation response signal in response to the effective interference exceeding the default power detection threshold, and wherein the RxBF directional parameter is identified by the spatial channel reservation signal via one of:
   the RxBF directional parameter and MIMO rank embedded into a payload of the spatial channel reservation signal; or
   the spatial channel reservation signal precoded using the RxBF directional parameter and MIMO rank.

29. The UE of claim 28, further including configuration of the at least one processor to:
   receive a precoding flag from the serving base station identifying that the spatial channel reservation signal is precoded for uplink transmissions.

30. The UE of claim 27,
   wherein the spatial channel reservation response signal identifies the TxBF directional parameter, and
   wherein the TxBF directional parameter is identified by the spatial channel reservation response signal via one of:
      embedding the TxBF directional parameter and MIMO rank into a payload of the spatial channel reservation response signal; or
      precoding the spatial channel reservation response signal using the TxBF directional parameter and MIMO rank, wherein the UE transmits a precoding flag to the serving base station identifying that the spatial channel reservation response signal is precoded for uplink transmissions.

* * * * *